US011353615B2

(12) United States Patent
Assous et al.

(10) Patent No.: US 11,353,615 B2
(45) Date of Patent: Jun. 7, 2022

(54) METHOD OF AND APPARATUS FOR CARRYING OUT ACOUSTIC WELL LOGGING

(71) Applicant: Reeves Wireline Technologies Limited, Leicestershire (GB)

(72) Inventors: Said Assous, Nottingham (GB); Peter Adrian Spencer Elkington, Loughborough (GB); Joanne Tudge, Leicestershire (GB); James Anthony Whetton, Nottingham (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 504 days.

(21) Appl. No.: 15/861,807

(22) Filed: Jan. 4, 2018

(65) Prior Publication Data
US 2018/0196156 A1 Jul. 12, 2018

(30) Foreign Application Priority Data
Jan. 10, 2017 (GB) .................................... 1700399

(51) Int. Cl.
*G01V 1/00* (2006.01)
*G01V 1/48* (2006.01)
(Continued)

(52) U.S. Cl.
CPC ................ *G01V 1/48* (2013.01); *G01V 1/305* (2013.01); *G01V 1/46* (2013.01); *G01V 2210/32* (2013.01); *G01V 2210/582* (2013.01)

(58) Field of Classification Search
None
See application file for complete search history.

(56) References Cited

U.S. PATENT DOCUMENTS 5,278,805 A 1/1994 Kimball
6,272,444 B1 * 8/2001 Thevoux-Chabuel .....................
G01V 11/00
702/179

(Continued)

FOREIGN PATENT DOCUMENTS

WO WO-2016187242 A1 * 11/2016 ............... G01V 1/44
WO 2017151834 A1 9/2017

OTHER PUBLICATIONS

Kimball, Christopher V., and Thomas L. Marzetta. "Semblance processing of borehole acoustic array data." Geophysics 49.3 (1984) : 274-281. (Year: 1984).*

(Continued)

*Primary Examiner* — Isam A Alsomiri
*Assistant Examiner* — Jonathan D Armstrong
(74) *Attorney, Agent, or Firm* — Blank Rome LLP

(57) ABSTRACT

In acoustic well logging, for each inversion depths of a well at which logging of data occurs, acoustic log signals representative of waveforms received at acoustic receivers are processed in a frequency domain to derive field dispersion curve(s). A neural net is operated to generate formation shear slowness value(s) from the curve(s), and resulting signal(s) indicative of shear slowness values are saved, transmitted, plotted, printed or processed. An apparatus for carrying out the method includes a logging tool having at least one activatable acoustic wave source; spaced and acoustically isolated therefrom in the logging tool an array of acoustic detectors that on the detection of acoustic wave energy generate electrical or electronic log signal(s) characteristic of acoustic energy waves detected by the acoustic detector(s); and at least one processing device associated with or forming part of the logging tool for processing the log signal(s).

30 Claims, 14 Drawing Sheets

(51) Int. Cl.
*G01V 1/46* (2006.01)
*G01V 1/30* (2006.01)

(56) References Cited

U.S. PATENT DOCUMENTS

| | | | | |
|---|---|---|---|---|
| 6,718,266 | B1* | 4/2004 | Sinha | G01V 1/48 367/75 |
| 7,675,813 | B2* | 3/2010 | Valero | G01V 1/288 367/27 |
| 8,456,952 | B2 | 6/2013 | Tang et al. | |
| 8,498,853 | B2* | 7/2013 | Crawford | G01V 99/00 703/10 |
| 8,681,582 | B2* | 3/2014 | Wu | G01V 1/50 367/14 |
| 2003/0223620 | A1* | 12/2003 | Anxionnaz | G01V 1/50 382/109 |
| 2004/0068375 | A1* | 4/2004 | Cook | A61B 5/316 702/11 |
| 2005/0261835 | A1* | 11/2005 | Wang | G01V 1/50 702/6 |
| 2006/0256655 | A1* | 11/2006 | Sinha | G01V 1/50 367/31 |
| 2010/0085835 | A1* | 4/2010 | Tang | G01V 1/30 367/32 |
| 2011/0058451 | A1* | 3/2011 | Yoneshima | G01V 1/284 367/31 |
| 2011/0255371 | A1* | 10/2011 | Jing | G01V 1/28 367/73 |
| 2011/0284314 | A1* | 11/2011 | Oraby | G01V 1/50 181/105 |
| 2015/0039235 | A1* | 2/2015 | Wiener | E21B 49/02 702/12 |
| 2015/0241591 | A1* | 8/2015 | Burmester | G06K 9/64 702/7 |
| 2015/0301213 | A1 | 10/2015 | Zharnikov | |
| 2015/0301214 | A1* | 10/2015 | Moos | G01V 1/50 367/31 |
| 2015/0356403 | A1 | 12/2015 | Storm | |
| 2018/0100950 | A1* | 4/2018 | Yao | E21B 47/09 |
| 2018/0142545 | A1* | 5/2018 | Lei | E21B 47/0005 |
| 2018/0149019 | A1* | 5/2018 | Bose | E21B 47/0005 |
| 2018/0196156 | A1* | 7/2018 | Assous | G01V 1/305 |
| 2019/0055830 | A1* | 2/2019 | Skataric | E21B 47/0005 |

OTHER PUBLICATIONS

Guilbot, J., and F. Magand. "Determination of the geoacoustical parameters of a sedimentary layer from surface acoustic waves: a neural network approach." Full Field Inversion Methods in Ocean and Seismo-Acoustics. Springer, Dordrecht, 1995. 171-176. (Year: 1995).*

Guerra, J. J., E. I. Velez, and C. Vasquez. "Hydraulic Fracture Design and Geomechanical Model Validation Using Sonic Scanner and Microseismic Measurements in Baco-1 Well." SPWLA 53rd Annual Logging Symposium. Society of Petrophysicists and Well-Log Analysts, 2012. (Year: 2012).*

Assous, Said, et al. "Dispersive Mode Processing of Borehole Acoustic Logs Using Fast Slowness-Frequency Inversion." Abu Dhabi International Petroleum Exhibition & Conference. Society of Petroleum Engineers, 2018. (Year: 2018).*

Mukhopadhyay, Pradip, Arthur Cheng, and Philip Tracadas. "The differential-phase based time-and frequency-semblance algorithm for array-acoustic processing and its application to formation-slowness measurement." Petrophysics 54.05 (2013): 475-481. (Year: 2013).*

Liu, Peng, et al. "An effective method to calculate permeability based on Stoneley waves." 2013 6th International Congress on Image and Signal Processing (CISP). vol. 3. IEEE, 2013. (Year: 2013).*

Assous, Said, and Peter Elkington. "Dispersion correction for acoustic borehole logging data." The Journal of the Acoustical Society of America 142.4 (2017): 2643-2643. (Year: 2017).*

Tran, Tho NHT, et al. "Multichannel filtering and reconstruction of ultrasonic guided wave fields using time intercept-slowness transform." The Journal of the Acoustical Society of America 136.1 (2014): 248-259. (Year: 2014).*

Abileah, Ron, and Stefano Vignudelli. "Bathymetry from fusion of multi-temporal Landsat and radar altimetery." 2011 6th International Workshop on the Analysis of Multi-temporal Remote Sensing Images (Multi-Temp). IEEE, 2011. (Year: 2011).*

Geerits, et al., "Centroid phase slowness as a tool for dispersion correction of dipole acoustic logging data," Geophysics, vol. 68, No. 1, Jan. 2003, pp. 101-107.

Stevens, et al., "Shear velocity logging in slow formation using the Stoneley wave," Geophysics vol. 51, No. 1, 1986, pp. 137-147.

Combined Search and Examination Report in counterpart UK Appl. GB 1700399.7, dated Jun. 20, 2017, 6-pgs.

Van Der Baan et al., "Neural Networks in geohpysical applications," Geophysics vol. 65, No. 4, Jul. 4, 2000, pp. 1032-1047.

* cited by examiner

METHOD OF AND APPARATUS FOR CARRYING OUT ACOUSTIC WELL LOGGING

FIELD OF THE DISCLOSURE

The subject matter of the present disclosure relates to an improved method of and apparatus for carrying out acoustic well logging

BACKGROUND OF THE DISCLOSURE

As is well known, prospecting for minerals of commercial or other value (including but not limited to hydrocarbons in liquid or gaseous form; water e.g. in aquifers; and various solids used e.g. as fuels, ores or in manufacturing) is economically and technically an important and challenging activity. For various reasons those wishing to extract minerals and other substances as aforesaid from below the surface of the ground or beneath the floor of an ocean need to acquire as much information as possible about both the potential commercial worth of the minerals in a geological formation and also any difficulties that may arise in the extraction of the minerals to surface locations at which they may be used.

For this reason, over many decades techniques of logging of subterranean formations have developed for the purpose of establishing, with as much accuracy as possible, such information. Depending on the type of logging technique adopted it can be possible to acquire formation information both before the extraction of minerals, etc., commences; and also, increasingly frequently, during the creation typically by drilling of a borehole, or other feature penetrating a formation, that is used to access and release liquids, gases and mixtures of value.

Many types of logging involve the insertion of a logging tool including a section sometimes called a "sonde" into a borehole or other feature penetrating a rock formation under investigation. The sonde is capable of emitting energy that passes into, and hence energizes in some way, the rock. The logging tool or another tool associated with it includes, usually spaced and energetically isolated from any part of the sonde that emits energy, one or more detectors or receivers (these terms being essentially synonymous) of such energy that has passed through the various components in the rock before being recorded by the logging tool or a processing device associated with the logging tool, based on activation of the detector(s).

Passage of the emitted energy through the rock formation alters its character. Knowledge of the attributes of the emitted energy and that detected after passage through the rock may reveal considerable information about the minerals and fluids in the vicinity of the borehole, as well as the structures, rock mechanical properties and other geological aspects that influence the ease with which a target material may be extracted and conveyed to a surface location.

In use of most known designs of logging tool, the tool is conveyed to a particular depth in the borehole, which may be at or near its "total depth" (i.e. the furthest downhole extremity along the borehole from the surface location at which the borehole terminates at its uphole end) but this need not be so and the logging tool can be usefully conveyed to almost any depth along the borehole as desired. The tool is drawn towards the surface termination of the borehole. The logging tool records log data at a series of logging depths on its travel along the borehole. Depending on the exact style of logging under consideration, logging may take place either when the logging tool is moving in a downhole direction, or when it is moving in an uphole direction.

As used herein "logging depth" refers to the location along the borehole, measured from the uphole end, at which a particular logging activity takes place. Most logging tools (or apparatuses associated with them) are able to record or indicate the depth along the borehole at which each logging action occurs, and this information is included in data logs when these are created, recorded, stored, printed or plotted for viewing. A logging tool may detect and record many hundreds or thousands of data sets during its travel along the borehole and it is important to identify the location in the borehole at which each batch of data is acquired.

One general category of formation parameters that it is desirable to log in the above manner relates to the acoustic slowness characteristics of the formation. Acoustic slowness is the inverse of acoustic velocity. Thus the slowness of a medium (that may be a formation, drilling mud, borehole fluid and so on) is the inverse of a measure of the speed at which an acoustic wave propagates through the medium.

Slowness measurements are used to determine the elastic properties of a formation that in turn are of considerable use in reservoir, drilling, completions and production engineering. The study of formation elastic properties underpins the science of rock physics that connects seismic and petrophysical behaviors. Accurate slowness measurements therefore are strongly desirable; and, conversely, inaccurate slowness measurements or such measurements in which users have little confidence are at best inconvenient, and may have positively detrimental effects.

Elastic properties of the rock are calculable from compressional and shear slowness data obtained using acoustic logging tools, which are also sometimes referred to as sonic logging tools. Such tools operate by causing acoustic waves to propagate through a formation and measuring the time taken for the waves to propagate across a series of logging tool detectors that are spaced as mentioned from a source of such waves. From such measurements it is possible to calculate the slowness parameters of the formation and hence various elastic properties.

The sonde of an acoustic logging tool includes one or more generators of acoustic energy often referred to as a source or transmitter, with the term "source" being preferentially used herein. In general the source of an acoustic logging tool is located within a cylindrical, elongate sonde having one or more transmissive windows or similar features that allow the acoustic energy on generation to pass from the sonde via fluid in the borehole so that it impinges on the rock adjacent the borehole.

The earliest designs of acoustic logging tools relied on monopole sources. These predominantly give rise to waves that emanate from a source equally in all directions. However, various constructions of source are nowadays known in the art and acoustic logging sources as a result may be categorized as monopole, dipole, quadrupole and multi-pole, depending on the types of waveform they generate. Since details of such source designs are familiar to those of skill in the art they are not described in detail herein.

A dipole source emits acoustic energy predominantly in a preferred direction rather than in multiple directions as a monopole source does. An advantage of a dipole source is that it excites a fundamental flexural mode whose velocity approaches the formation shear velocity at low frequency. At high frequency, this asymptotes to the velocity of the Scholte wave, which is a wave that propagates at the interface between a fluid (such as borehole mud) and an elastic solid medium (such as the rock of the formation). The flexural wave is a guided wave and exhibits structural (geometrical) dispersion effects. As a result the flexural wave reflects borehole as well as formation properties.

One type of dipole acoustic generator used in logging is a so-called "cross-dipole" source, in which two sets of dipole sources are orthogonally mounted in the transmitting sonde section of the logging tool, information form the "second" source of the two sets being used mainly for the determination of velocity anisotropy.

The acoustic wave from a monopole source on impingement on the rock induces a compressional wave component (referred to as a P-wave) and a shear wave component (referred to as an S-wave). If the shear slowness of the rock is faster than the compressional slowness of the mud in the borehole between the logging tool and the borehole wall, the formation is said to be "fast".

The P-wave and S-wave propagate in the rock such that respective compressional and shear head waves radiate energy back into the borehole in the form of compressional waves and so subsequently are detectable by typically a plurality of detectors, referred to as explained as receiver arrays herein, that form a part of the elongate logging tool that is spaced from the sonde section.

The times taken for each of the head waves to stimulate the series of detectors may be used to calculate the slowness of the formation. Since both P- and S-waves propagating in the rock are detectable in the borehole in the case of a fast formation it is possible to calculate both compressional and shear slowness values for the formation.

Since the receiver stations of the receiver array are located at increasing spacings from the acoustic source, a sequence of detector activations occurs as the wave train reaches each successive receiver station location in turn. The activations of the detectors give rise to electrical signals that are processed in various ways in order to derive information about the formation from the detected waves. In particular the time taken for a particular waveform mode to trigger the array of detectors is used to determine the velocity, and hence the slowness, of the exciting wave.

It is possible for the shear slowness of the rock to be slower than the compressional slowness of the borehole mud. In this situation the formation is said to be "slow". In a slow formation impingement of the monopole source wave on the borehole wall gives rise to compressional and shear motion in the rock, but the shear energy does not radiate a detectable wave component in the borehole; and instead only the compressional wave from the formation is detected at the receiver array.

Therefore, in the case of a monopole excitation in a slow formation, it is possible to determine the compressional slowness of the rock by way of a direct measurement, but direct measurement of the shear slowness is not possible. However, an indirect estimate of shear slowness may be obtained from the flexural mode excited by a dipole source, noting that the flexural mode is dispersive (meaning that its slowness depends on its frequency) and requires appropriate processing to extract the low frequency asymptote that travels with a slowness close to that of the shear wave.

It is possible to fit a curve (a "dispersion curve") to the dispersion of slowness values of a particular formation at a particular logging depth. The dispersion curve relates slowness values to the frequencies of the waves generated by the source.

Slowness Time Coherence (STC) processing of dipole acoustic waveforms is one known processing technique, and includes the step of passing a "window" (which term in this context is familiar to the person of skill in the art) across received waveforms and measuring the coherence within the window. STC processing is advantageous in that the slowness estimation is insensitive to variations in mud slowness and borehole size. On the other hand the major part of the energy received at the detectors may be at frequencies higher than the aforementioned low-frequency asymptote. Therefore STC results tend to be biased to slower values associated with higher frequencies.

Filtering the waveforms prior to STC processing to reduce the high frequency content reduces the bias at the cost of reduced signal-to-noise ratio, but it does not eliminate it. Furthermore, the frequency content of the waveforms may vary on a depth-by-depth (or bed-by-bed) basis, in which case the filters also need to change in order to be optimal. This can be time-consuming, especially if it requires human intervention. Even after filtering, the STC calculation will still include multiple frequencies.

In fact, maximum excitation occurs at a frequency that can be significantly different from the low-frequency asymptote. It therefore is a common practice to derive a "dispersion correction" that must be applied to STC-derived shear slowness logs before the latter can be considered useable—even if the waveforms have been pre-filtered. The slowness correction has a different value at each point in the STC slowness log, and therefore also depends on the pre-filtering that has been applied. As a result it represents a significant computing burden, especially when log results are required to be generated in real-time or near real-time (as may be a requirement in logging while drilling (LWD) operations, for example).

In addition to the foregoing, the generation of acoustic waves in a borehole gives rise to another dispersive phenomenon known as the Stoneley wave. This travels according to a known mechanism along the interface between the mud in the borehole and the rock of the formation. Stoneley waves received at the detectors cause the generation of signals that can be used to estimate the permeability of the rock of the formation.

Various methods, that may be termed frequency-slowness (FS) methods, one sub-class of which is termed frequency-slowness-semblance (FSS) methods herein, exist for extracting dispersion information from waveforms. These include Weighted Spectral Semblance (WSS), Prony's method, Backward and Forward Extended Prony, Matrix Pencil, Maximum Entropy (ARMA), Predictive Array Processing, Maximum-Likelihood, Non-Parametric, Homomorphic Processing, Differential Phase Processing and Amplitude and Phase Estimation (APES) methods.

Prior Art Methods of Dispersion Processing

Geerits and Tang (T. Geerits and X. Tang, "Centroid phase slowness as a tool for dispersion correction of dipole acoustic logging data," Geophysics, Vol. 68, No. 1, January 2003, pgs. 101-107) argue that the moveout of a dispersive wave obtained from a non-dispersive time-domain array processing method such as STC is a weighted spectral average of the dispersion curve of the wave. They derive a correction factor for the STC-derived slowness by comparing it to the slowness from a modelled dispersion curve at two frequencies. In other words, they do not consider the whole dispersion curve. This method is likely to be sensitive to noise with high uncertainty.

Tang et al (Xiao Ming Tang, Chen Li, and Douglas J. Patterson, "Curve-fitting technique for determining dispersion characteristics of guided elastic waves," U.S. Pat. No. 8,456,952) extend the method to the whole dispersion curve by fitting a sigmoid function to the curve and estimating the true slowness from the function. In practice, however, real-world data may not be amenable to a sigmoid-function fit. In particular, dispersion curves are not always well-defined, symmetric sigmoids or hyperbolic tangents with a well-defined inflexion point, particularly in slow formation cases. The precise shape of a dispersion curve depends on many parameters, and can be grossly asymmetric.

Stevens and Day, "Shear velocity logging in slow formation using the Stoneley wave," Geophysics Vol. 51, No. 1, 1986, pgs. 137-147, use a model-based technique to generate simulated waveforms then carry out curve fitting in a least square sense between synthetic and field waveforms. Although the method seems valid it is not cost-effective as doing a least squares fit between synthetic waveforms and field waveforms (with noise) is problematic.

U.S. Pat. No. 5,278,805 uses a development of STC called dispersive STC (DSTC) in which the STC-derived shear is an input to a modelled dispersion curve. This is expressed as phase shifts for each frequency above the low-frequency asymptote. These are then reversed (back-propagated to flatten the dispersion curve), and applied to the observed waveforms (equivalent to time-shifting each frequency component). The modified waveforms are then STC processed to obtain slowness without a dispersion effect.

This process relies on the assumption that the modelled dispersion curve matches the observed curve.

US Patent Publication 2015/0301213 further extends the DSTC method by including anisotropy in the model. The disclosure re-iterates the back-propagation approach described in U.S. Pat. No. 5,278,805, but seemingly requires an iterative step to help get a good match.

The foregoing methods in various ways either are believed to be computationally inefficient, or slow to implement, or fail to provide accurate results in which users can have confidence. The subject matter of the present disclosure seeks to improve the determination of slowness.

SUMMARY OF THE DISCLOSURE

According to the present disclosure in a first aspect, there is provided a method of acoustic well logging comprising, for each of a plurality of inversion depths of a well at which logging of data occurs or has occurred in generally anisotropic rock formations, carrying out the steps of (a) processing in the frequency domain a plurality of acoustic log signals representative of waveforms received at a plurality of acoustic well logging receivers to give rise to one or more flexural or Stoneley mode field dispersion curves; (b) operating a neural net to generate one or more formation shear slowness values from either the flexural or Stoneley mode field dispersion curves and (c) saving, transmitting, plotting, printing or processing one or more resulting signals that are indicative of shear slowness values.

Such a method advantageously allows the accurate determination of shear slowness, even in the case of a slow formation as described above. As a result the need for STC processing is obviated at least in embodiments of the method in which inversion is performed at every logging depth. In experimental calculations described herein in embodiments in which inversion is performed at every logging depth STC estimations are calculated in order to demonstrate elimination of the need to provide a dispersion correction, but this is done chiefly to demonstrate the benefits of the present disclosure.

The person of skill in the art will readily understand the term "inversion depth" as used herein.

In particular, this term refers to those depths along the borehole at which inversion of log data occurs. Inversion may take place e.g. at each borehole depth at which logging of data is carried out.

An STC shear slowness may be calculated and at each inversion the difference between the shear slowness calculated using the method of the present disclosure and the STC-derived shear slowness may be determined. The result may be taken to be the STC correction. For depth intervals in which formation slowness does not change rapidly, such embodiments assume that the correction is slow moving, allowing it to be interpolated between the inversion points.

The method of the present disclosure furthermore avoids the need for an iterative approach as proposed in US 2015/0301213. As a result, the method of the present disclosure may be operated in a very short timescale, thereby making it highly suitable for e.g. LWD situations, and other occasions when it is required for slowness calculations to be completed at high speed.

As is apparent from FIG. 2a, the excitations of the receiver stations may give rise to time-domain electrical signals. As necessary, therefore, the method of the present disclosure may include the optional step of transforming one or more of the plurality of acoustic log signals to the frequency domain.

The method of the present disclosure, moreover, avoids the need to forward-model at every depth, during logging operations, a large number of possible synthetic dispersion curves and iteratively seeking to select the best-matching synthetic curve to the field slowness data. Instead, the use of synthetic dispersion curves is limited only to the training of the neural net. This saves considerably on computing time e.g. in field situations.

Thus, the method of the present disclosure contemplates use of the neural net in either of two ways: (i) in order directly to output slowness values from observed dispersion data; and (ii) as a replacement for the iterative step in an otherwise classical inversion process (which in the prior art involves iterating the differences between observed dispersion data and sets of pre-computed forward-modelled dispersion curves).

The inventive method self-evidently involves a transformation of acoustic energy to a particular form of electrical signal, having the characteristics specified herein. Such signals may be processed in a variety of ways and following or as part of practicing of the method of the present disclosure may be used e.g. to control the appearance of pixels of a display screen or the activity of a printer or plotter. The signals following processing in accordance with the present disclosure also may be used to control the status of a memory device for the purpose of storing data related to the signals; and/or in the generation of commands (e.g. for controlling drilling equipment) and various other outputs as will be familiar to one of skill in the art.

Preferably, the waveforms received at the one or more acoustic well logging receivers include energy representative of formation shear waves.

In one preferred embodiment of the present disclosure, the plurality of inversion depths of the well in respect of which the steps are carried out corresponds to a plurality of logging depths of the well at which logging of data occurs or has occurred in a one to one relationship. In such a case there is no need at all for the calculation of an STC shear slowness as in the prior art, or for the determination of an STC correction. This means that considerable processing time can be saved, with concomitant advantages.

In an alternative embodiment of the method of the present disclosure, the plurality of inversion depths of the well in respect of which the steps are carried out corresponds to each $N^{th}$ logging depth of the well at which logging of data occurs or has occurred, N being a real integer number that is greater than unity.

In one embodiment of the method, it is possible at each $N^{th}$ logging depth to calculate shear slowness using an STC method, and use this as a means of determining an STC correction. To this end, the method of the present disclosure optionally includes the steps of (d) calculating in respect of each $N^{th}$ logging depth of the well a slowness-time coherence (STC) value of shear slowness; (e) developing therefrom an STC shear slowness curve corresponding to the shear slowness values at the N respective logging depths; (f) developing from the measures of shear slowness of the formation at each $N^{th}$ inversion depth an inversion shear slowness curve; (g) comparing the STC and inversion shear slowness curves at each $N^{th}$ inversion depth and generating therefrom a correction curve; (h) interpolating the correction curve between the said inversion depths; and (i) applying the correction to the STC curve calculated at every depth.

Regardless of whether inversion as aforesaid is carried out at each logging depth or simply every $N^{th}$ depth also as described above, the step of deriving a field dispersion curve from the transformed acoustic log signals preferably includes the step of (b1) extracting dispersion information from the transformed acoustic log signals using one or more techniques selected from the list including weighted spectral semblance (WSS), Prony's method, Backward and Forward Extended Prony, Matrix Pencil, Maximum Entropy (ARMA), Predictive Array Processing, Maximum Likelihood, Non-Parametric, Homomorphic Processing, differential Phase Processing and Amplitude & Phase Estimation (APES) methods in order to generate a field frequency-slowness map containing a frequency semblance curve.

FSS, slowness frequency semblance (SFS) and slowness frequency coherence (SFC) may be treated as synonymous terms herein. As explained however, FSS is a sub-set of frequency-slowness methods, which need not within the context of the present disclosure involve a semblance analysis. An example of a frequency-slowness method that does not rely on a semblance assessment is disclosed in GB 2515009 A.

Conveniently, the step (a) of deriving a field dispersion curve includes the step of (a2) picking coherence peaks from the field slowness-frequency semblance map and generating therefrom a field dispersion curve. Such peak picking beneficially may be accomplished in a variety of ways. A variety of algorithms exists for identifying zones of maximum semblance/coherence in a semblance plot.

The method of the present disclosure may include the step of (a3) fitting a smooth curve joining plural apparent coherence peaks in a region of the field frequency-slowness map and interpreting the field slowness-frequency semblance map such that picked peaks are constrained to be values lying on the smooth curve governed by the physics underlying the logging activity.

This optional step addresses the possibility that peak picking may not guarantee continuity across the frequency range needed to characterize the dispersion curve. A benefit of constraining the picked peaks as aforesaid is that this takes account of the absence of high frequencies as is typical in slow formations; and also cases in which high and low frequencies are present (as is typical of fast formations). Furthermore the use of the smoothing technique is advantageous in dealing with noisy data.

The preferred smoothing solution involves the use of a Shape Language Model (SLM) algorithm, as explained further herein.

As explained, the choice of implementation of the neural net results in the direct calculation of slowness, without any need for iterative processing or selection of slowness curves from a database or other set of forward modelled curves.

A characteristic of semblance maps derived from acoustic log data is that they often contain aliases and coherent fragments, especially in cases of noisy data and/or when there are rapid changes in formation slowness (as occurs across bed boundaries, for example). FIG. 4 illustrates the existence of aliases.

In FIG. 4, the mode of interest is highlighted by way of black peak picks 24 that give rise to a slowness curve. The semblance plot, however, contains several other features including aliases. The aliases are such that if processing is started using the wrong section of the plot they would give entirely inaccurate results.

It is necessary to avoid the danger of inadvertently basing the calculation of slowness on an alias, and to this end the method of the present disclosure preferably includes the step of (j) using a mask to isolate a region of the field slowness-frequency-semblance map of interest in order to eliminate the risk of picking of coherence peaks derived from aliases and/or other unwanted modes in the field slowness-frequency-semblance map. In preferred embodiments of the present disclosure the method includes the step of (k) selecting the position of the mask based on a preceding field dispersion curve.

Optional embodiments of the present disclosure include the step of (l) applying a shape language model (SLM) algorithm during generation of the field slowness-frequency semblance map whereby to reduce or eliminate one or more artefacts selected from the list including: noise in the field slowness-frequency semblance map values; uncertainty in aspects of the slowness values in the field slowness-frequency semblance map at low frequencies; the absence and/or distortion of an asymptote of the slowness-frequency semblance in the field slowness-frequency semblance map; and/or discontinuities in the field slowness-frequency semblance curve, as defined and explained herein.

For the avoidance of doubt, the method of the present disclosure preferably includes the steps of (m) deploying an acoustic logging tool to a chosen depth along a borehole in a subterranean formation; (n) causing withdrawal of the logging tool towards a surface location; (o) at each of a plurality of logging depths of the acoustic logging tool in the borehole, causing the logging tool to emit one or more acoustic energy waves, using one or more acoustic energy sources, such that the acoustic energy waves impinge on the formation; (p) causing the logging tool to detect one or more acoustic energy waves that have passed through the formation using an array of acoustic energy detectors that are spaced along the acoustic logging tool from the one or more acoustic energy sources, that are acoustically isolated from the one or more acoustic energy sources and that are activated by the detection of acoustic energy waves; (q) causing the logging tool to generate plural acoustic log signals that are characteristic of acoustic energy waves detected by the one or more acoustic energy detectors; and (r) processing the acoustic log signals in accordance with at least Steps (a) to (c) hereof. The method of the present disclosure for further reasons thus self-evidently further involves a transformation of acoustic energy to processed electrical or other signals that are indicative of slowness values of the formation.

For the additional avoidance of doubt, the method of the present disclosure optionally includes the steps of processing the acoustic log signals in accordance with one or more of Steps (d) to (q) hereof. The person of skill in the art in selecting such steps of course would choose such combinations of the steps as are workable and non-contradictory.

In preferred embodiments of the present disclosure, the acoustic log signals are generated as electrical or electronic signals. It is however known in the data logging art to generate signals that are indicative of measured and/or calculated quantities in other ways. To the extent that such alternative signal types are compatible with the method and apparatus of the present disclosure, the subject matter as claimed herein extends to such embodiments.

When the signals are embodied as electrical or electronic signals, preferably the method of the present disclosure includes the step of processing the electrical or electronic signals using a processor forming part of the acoustic logging tool. Such logging tool designs are known per se and typically include programmable elements that can be programmed to carry out the inversion steps of the method of the present disclosure on signals generated in the logging tool.

Additionally or alternatively, however, the method of the present disclosure may include the step of processing the electrical or electronic signals using a remote processor that is spaced from the acoustic logging tool. In such a case the signals may be telemetered (or otherwise transmitted) from a logging tool to the remote processor essentially in real time, for example using a technique such as wireline transmission or coded mud pulse generation; or the logging tool may be of a type that includes an on-board memory. The latter may record the signals, or analogues of them, for downloading to the remote processor after the logging tool has been recovered to a surface location at the end of a logging operation.

The step (o) of causing the acoustic logging tool to emit one or more acoustic energy waves optionally includes operating one or more of a dipole or quadrupole acoustic energy source forming part of the acoustic logging tool.

The method of the present disclosure is considered to reside additionally in the step of creating a log, plot, array or database of formation shear values generated through carrying out of at least Steps (a) to (c) hereof. Such a method further optionally includes the steps of displaying, storing or transmitting the log, plot, array or database or generating one or more further signals derived therefrom; and additionally the optional step of processing the one or more further signals According to a further aspect of the present disclosure, there is provided apparatus for carrying out acoustic logging including a logging tool having at least one activatable source of acoustic waves; spaced and acoustically isolated therefrom in the logging tool one or more detector of acoustic wave energy that on the detection of acoustic wave energy is capable of generating one or more electrical or electronic log signals that are characteristic of acoustic energy waves detected by the one or more detector of acoustic wave energy; and at least one processing device associated with or forming part of the logging tool that is capable of processing the electrical or electronic log signals in accordance with the method of the present disclosure as defined herein.

Preferably, the processing device is programmable and is programmed to carry out at least steps (a) to (c) of the method discussed above, and preferably additionally one or more of the steps of any one or more of the details discussed above.

In addition to the foregoing, the present disclosure is considered to reside in a non-transitory computer-readable storage medium storing computer-readable instructions for estimating the shear slowness of a subterranean formation which, when implemented by a processor, cause the processor to implement a method of acoustic well logging comprising, for each of a plurality of inversion depths of a well at which logging of data occurs or has occurred in generally anisotropic rock formations, carrying out the steps of (a) processing in the frequency domain a plurality of acoustic log signals representative of waveforms received at a plurality of acoustic well logging receivers to give rise to one or more flexural or Stoneley mode field dispersion curves; (b) operating a neural net to generate one or more formation shear slowness values from either the flexural or Stoneley mode field dispersion curves and (c) saving, transmitting, plotting, printing or processing one or more resulting signals that are indicative of shear slowness values.

The present disclosure pertains to the subject of acoustic logging in which the logging tool records characteristics of emitted acoustic (or fluid pressure) energy that has travelled predominantly e.g. along the borehole wall from the emitting part of the sonde to the detector(s). The subject matter of the present disclosure as defined herein is not limited to any particular direction of movement or mode of conveyance of the logging tool. The subject matter of the present disclosure pertains to acoustic logging tools and the electrical signals they generate, logs created using such tools, methods of operating acoustic logging tools, and methods of processing data.

BRIEF DESCRIPTION OF THE DRAWINGS

There now follows a description of preferred embodiments of the present disclosure, by way of non-limiting example, with reference being made to the accompanying figures in which:

FIG. 3 is a conventional STC plot based on the output signals summarized in FIG. 2a;

DETAILED DESCRIPTION

Figure 1A:
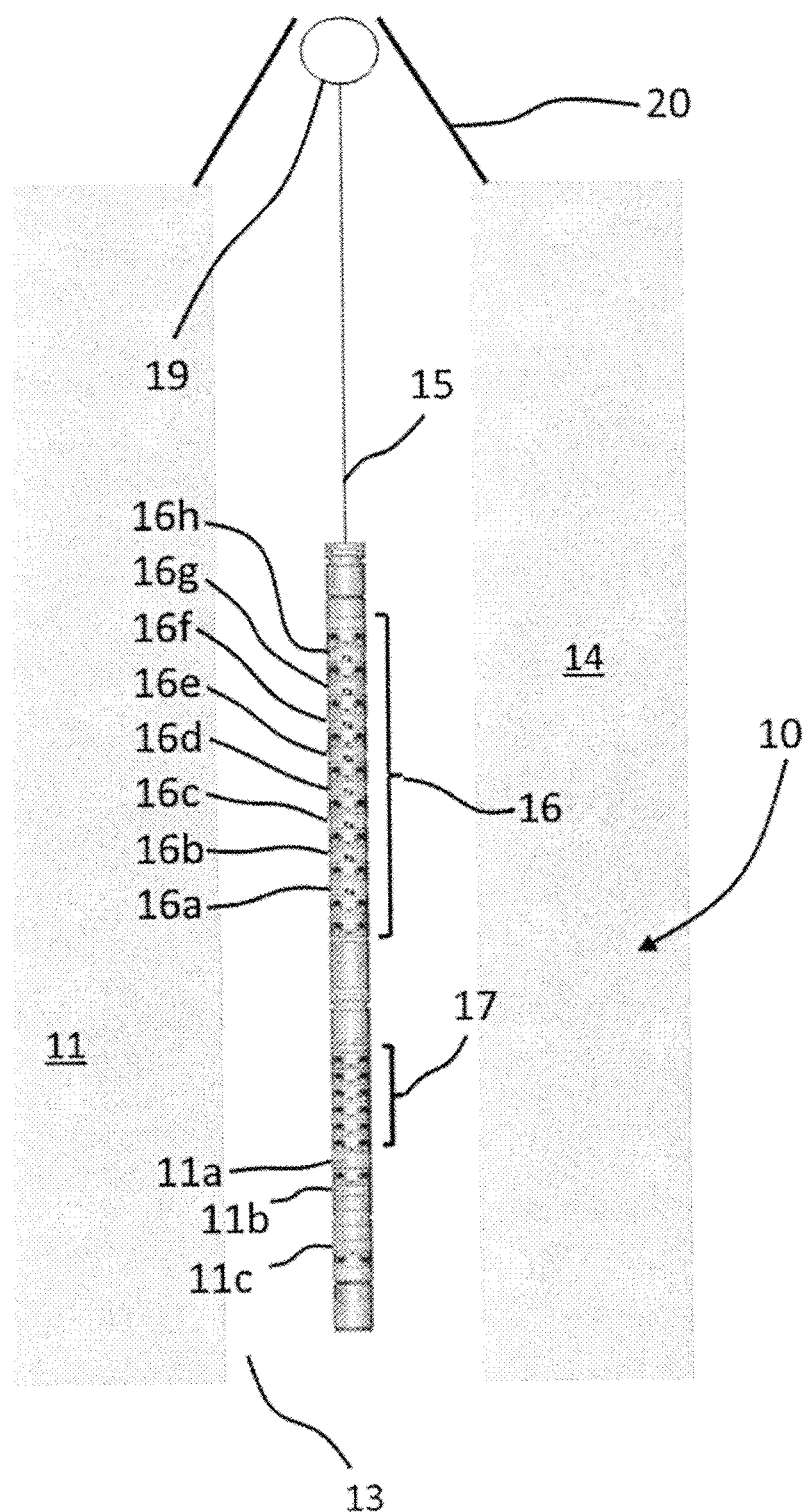
FIG. 1a is an elevational view of one type of acoustic logging tool, of many possible types, with which the method of the present disclosure is useable.

FIG. 1a illustrates one form of modern acoustic logging tool 10. Logging tool 10 includes in the illustrated embodiment three acoustic sources 11a, 11b, 11c secured towards the in-use downhole end of the elongate, cylindrical tool 10. The acoustic sources are respectively a monopole source 11a and X- and Y-axis dipole sources 11b, 11c.

The logging tool 10 also includes a series of receivers secured in a linear array 16. The receiver array 16 is spaced along the tool/sonde 10 from the sources 11a, 11b, 11c and is isolated from them by way of an acoustic isolator section 17. The isolator section 17 is intended to ensure that energy generated in the sources 11a, 11b, 11c does not contaminate the outputs of the receivers forming the array 16 by way of direct propagation via the material of the tool 10.

As is apparent from FIG. 1a, the receivers of the linear array 16 are spaced at intervals along a length of the logging tool. In the non-limiting arrangement shown in FIG. 1, the array 16 comprises 8 receiver stations 16a, 16b, 16c, 16d, 16e, 16f, 16g, 16h each including four detectors. The lowermost receiver station 16a is located just less than half-way down the logging tool 10 and the uppermost receiver station 16h adjacent the in-use uphole end of the logging tool 10. However, many variants of this aspect are known, with more or fewer receiver stations 16, containing more or fewer detectors, and different arrangements of them, being known. For the avoidance of doubt, the terms "receiver" and "receiver station" are often used somewhat synonymously in the art.

The logging tool 10 is schematically shown in FIG. 1a suspended in a borehole 13 formed in a subterranean formation 14 by wireline 15 dispensed from a drum 19 associated with a derrick 20 or other surface-located support. This is one way of arranging for deployment of the logging tool 10 in a borehole. Another, similar arrangement is described in more detail with reference to FIG. 1b hereof; and further options for logging tool deployment are also discussed herein.

The acoustic impulse resulting from activation of an acoustic logging tool source typically is of short duration and high amplitude. It excites multiple modes in and around the borehole 13 and depending on their type these travel as body waves or guided waves. The guided waves are dispersive. In a dispersive wave, each component frequency travels at a different speed and with a different attenuation.

As noted previously, one type of dipole acoustic generator used in logging is a so-called "cross-dipole" source, in which two sets of dipole sources are orthogonally mounted in the transmitting sonde section of the logging tool, information form the "second" source of the two sets being used mainly for the determination of velocity anisotropy. The inventive examples described herein and as illustrated in FIG. 1a relate to experimental work completed using cross-dipole sources, but for the avoidance of doubt the techniques of the present disclosure potentially are applicable to any source that gives rise to a dispersive mode, including but not limited to single-axis dipole sources and quadrupole sources.

To be clear, therefore, the method of the present disclosure defined hereinbelow is applicable in situations such as but not limited to those illustrated in FIGS. 1a and 1b. The method also can be applied/extended to screw modes from quadrupole sources, and to Stoneley mode (discussed previously) from monopole sources.

As noted previously, various methods, that may be termed frequency-slowness (FS) methods, one sub-class of which is termed frequency-slowness-semblance (FSS) methods herein, exist for extracting dispersion information from waveforms. These include Weighted Spectral Semblance (WSS), Prony's method, Backward and Forward Extended Prony, Matrix Pencil, Maximum Entropy (ARMA), Predictive Array Processing, Maximum-Likelihood, Non-Parametric, Homomorphic Processing, Differential Phase Processing and Amplitude and Phase Estimation (APES) methods.

Figure 2A:
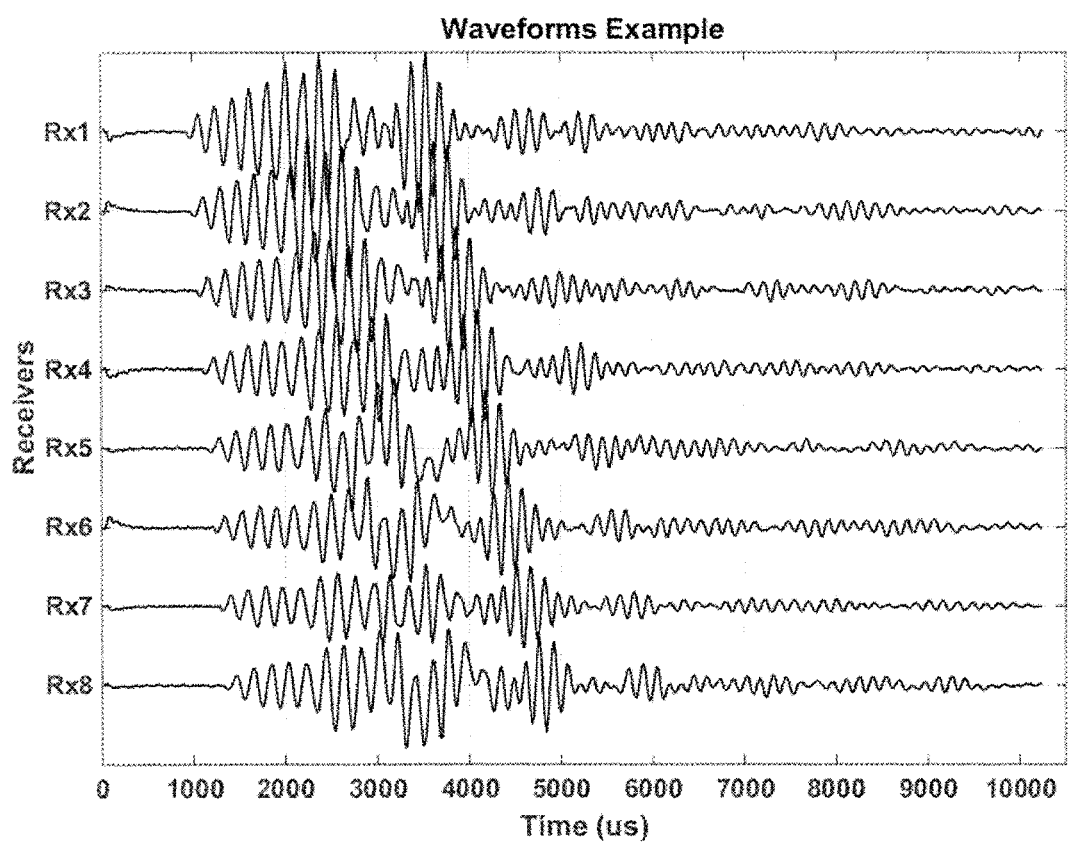
FIG. 2a shows example signals as a function of time from an acoustic logging tool receiver array comprising eight receiver stations.
Figure 2B:
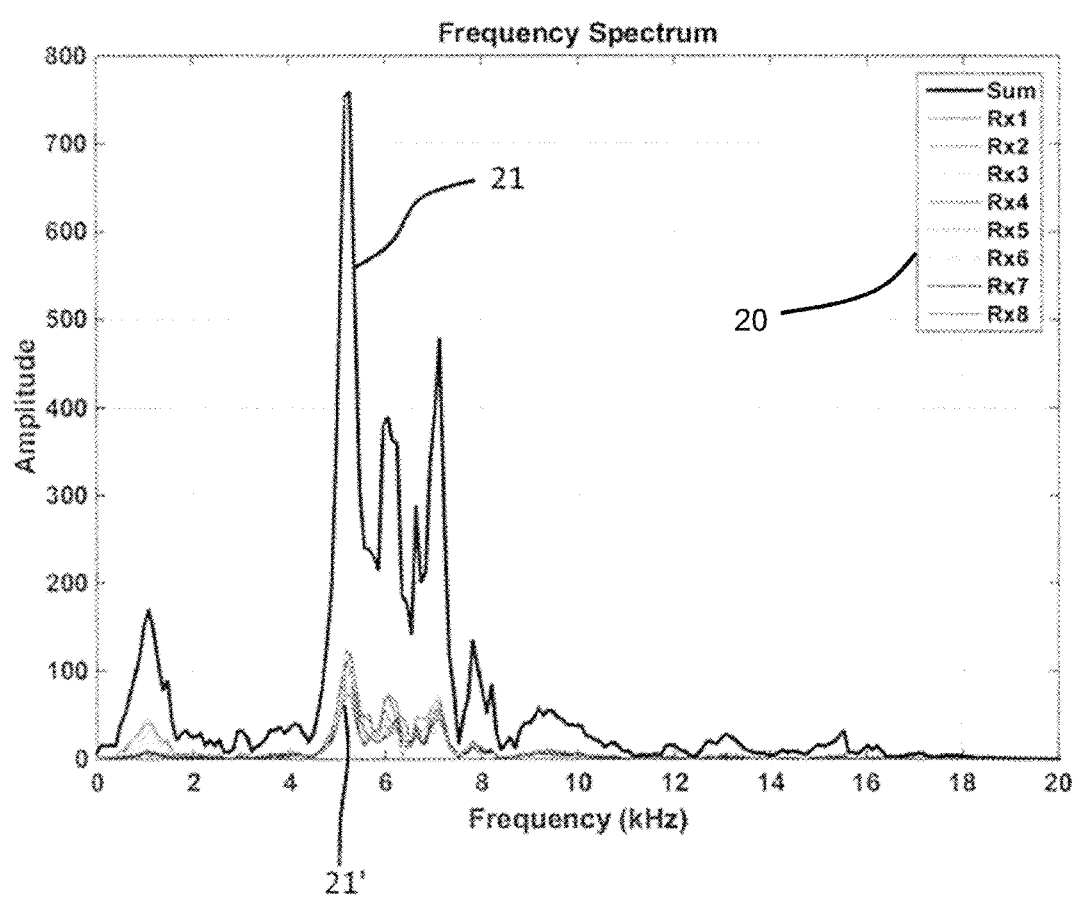
FIG. 2b is an amplitude-frequency plot of the outputs of each of eight receivers of an array of an acoustic logging tool, together with a sum plot showing the cumulative receiver output and hence the frequencies of coherence peaks.

FIGS. 2a and 2b show an example of a commonplace form of the acoustic signals generated using the receiver array of an acoustic logging tool including a cross-dipole acoustic source.

FIG. 2a plots receiver signal amplitude against time; and FIG. 2b shows the same information following transformation to the frequency domain.

Figure 1B:
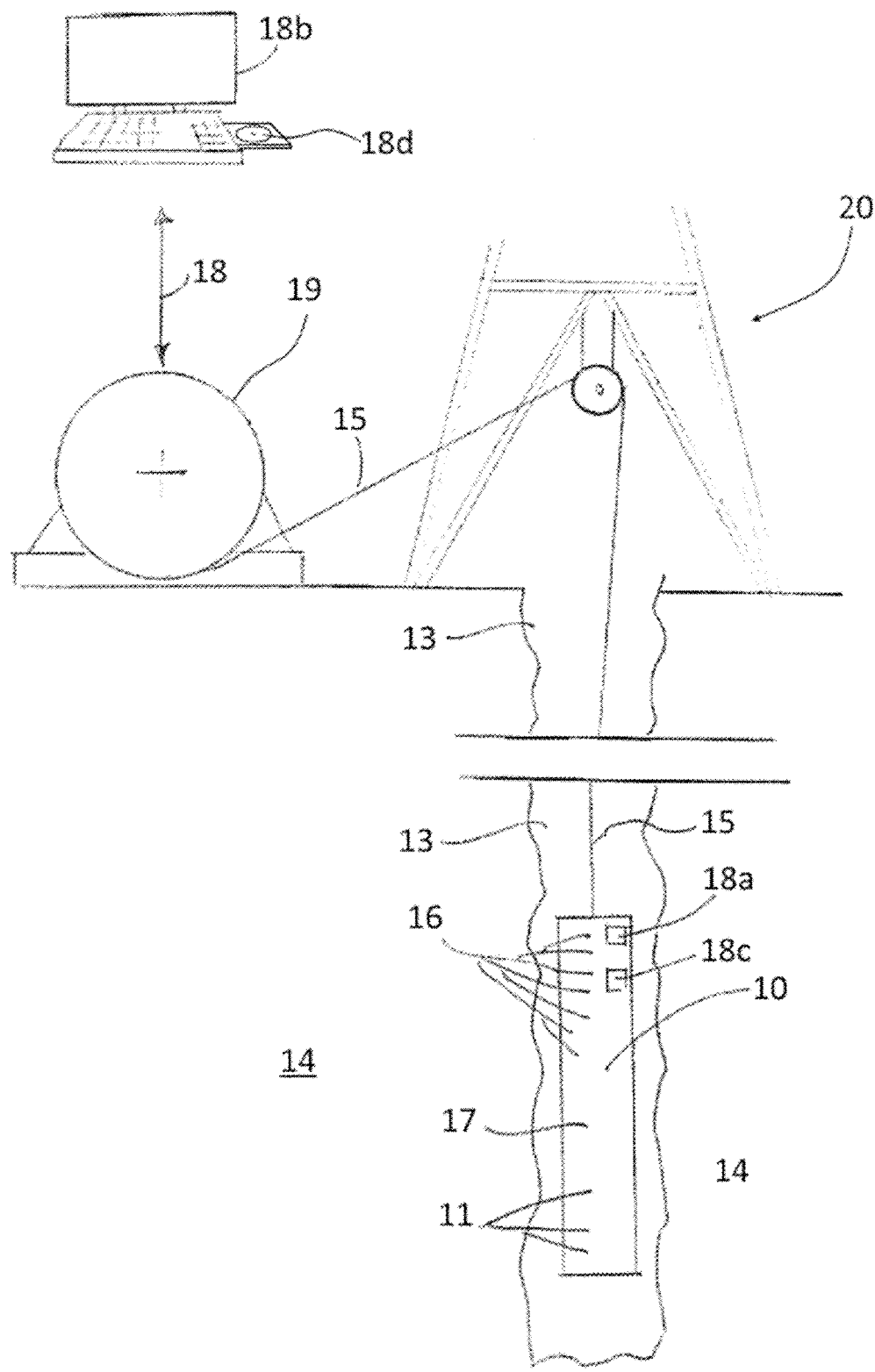
FIG. 1b is a sectioned view of a rock formation having a borehole formed therein and showing one typical method, of several known in the art, of deploying and using an acoustic logging tool that for convenience is shown in schematic form.

As implied by the plot labels Rx1, Rx2, Rx3, Rx4, Rx5, Rx6, Rx7 and Rx8; and legend 20 in FIG. 2b, the logging tool responsible for generating the acoustic signals includes an array of eight receivers (detectors) such as or similar to the receivers 16a-16h of FIG. 1b.

FIG. 2a shows typical receiver station electrical signal amplitudes resulting from operation of the detectors constituting the receiver stations. Those having experience of such plots will be able to recognize e.g. compressional wave, shear wave and Stoneley wave sections of the excitations of the detectors. It is not necessary to discuss these aspects in detail herein as they have been widely studied. Of relevance to the present disclosure is the fact that in the receiver labelled Rx1, which corresponds to station 16a in FIG. 1a located relatively close to the sources 11, the various waves cause excitation sooner than in the next adjacent receiver Rx2 corresponding to station 16b of FIG. 1a, and so on. This is the consequence of the increasing spacings of the consecutively numbered receivers 16 from the sources 11.

The outputs of the receivers following conversion to the frequency domain are plotted in FIG. 2b as plot lines 21'. These are each of relatively low peak amplitude but a sum amplitude plot 21 shows the coherence peaks in the outputs of the receivers more markedly.

Sum plot line 21 shows that coherence peaks exist in the receiver outputs at multiple frequencies, which depend on numerous parameters of the borehole environment.

In FIG. 2b the peak of sum line 21 at approximately 1 kHz corresponds to the Stoneley wave arrival at late times; and the flexural mode is mainly around 5 kHz.

Figure 3:
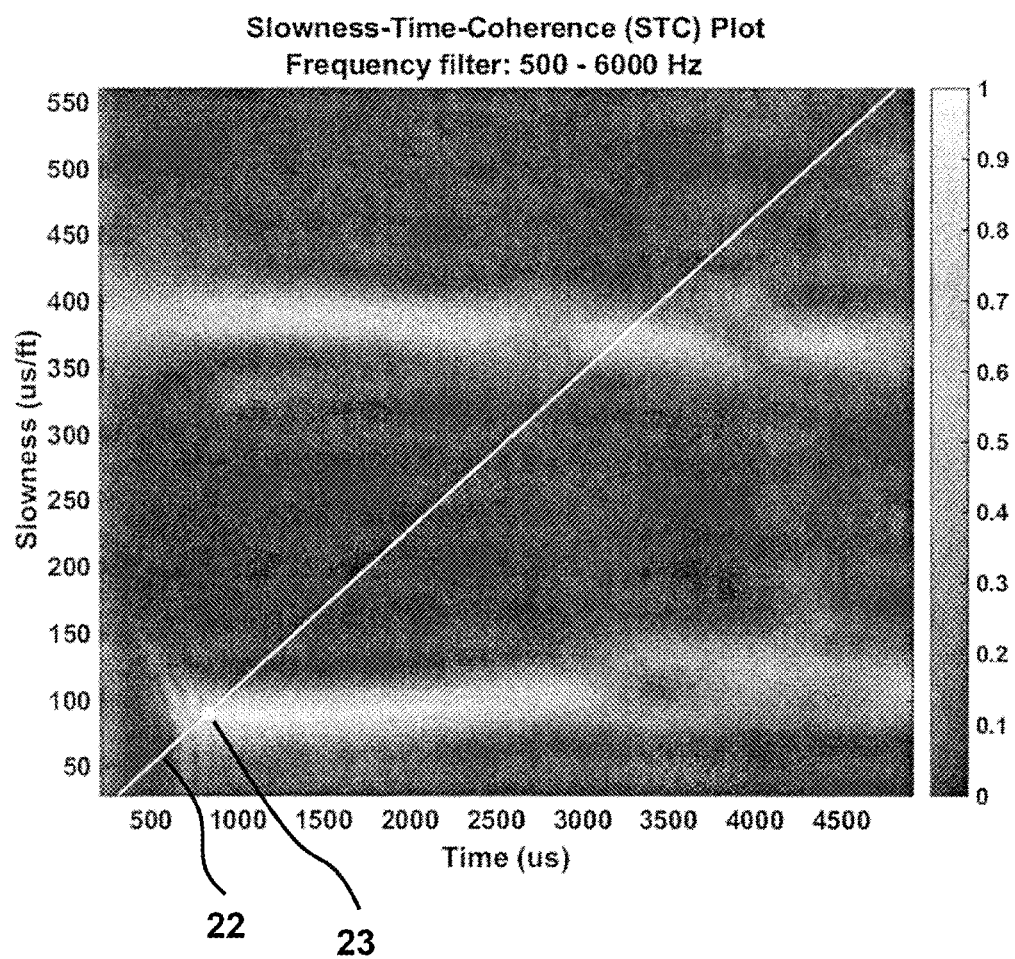

FIG. 3 shows the FIG. 2a data following STC processing to plot slowness (µs/ft) against time (µs). In FIG. 3 the lighter shading indicates higher coherence levels in the windowed signals of the receivers at different "moveouts"

(angles on the absolute wave energy output plot of the receivers that correspond to differing slowness values). The coherence peaks correspond to individual wave types such as compressional, shear and Stoneley, and hence indicate the estimated slowness values for each mode.

The bright horizontal feature around 90 μs/ft corresponds to the shear arrival; and the bright horizontal feature at 400 μs/ft is an alias not to be confused with a mode arrival. Persons skilled in the processing of digital signals will be familiar with the concept of an alias, and aspects of the present disclosure are directed to the avoidance of selecting aliases rather than modes of interest.

White line 22 indicates the so-called "tool line". Workers of skill in the art are familiar with the concept of the tool line, which is used as a quality check. The tool line represents the relationship between travel time (i.e. the time from source to receiver) and slowness in the ideal case of a tool centralized in a borehole of a chosen size and mud of a known slowness. Travel times that are shorter than indicated by the tool line typically are regarded as unrealistic. Point 23 shows the intersection of the tool line with a coherence peak, and is indicative of the slowness of the corresponding mode.

The STC log data always include a mix of frequencies from which it is difficult reliably to isolate the lowest frequencies; and anyway the requisite low frequencies are only detectable if the borehole system supports them. This is not always the case.

In the illustrated example, the STC slowness is biased by the slower frequencies above 5 kHz. Analysts seek to reduce the bias by filtering to remove the higher frequencies, but the small amount of energy remaining after filtering means the result is susceptible to noise, i.e. noise tends to overwhelm the useful signals.

For the avoidance of doubt, several of the various slowness-time-coherence and slowness-frequency-semblance plots hereof are necessarily indistinct in some respects. This is an accurate depiction of the types of plot that are generated in real-life logging situations.

Figure 4:
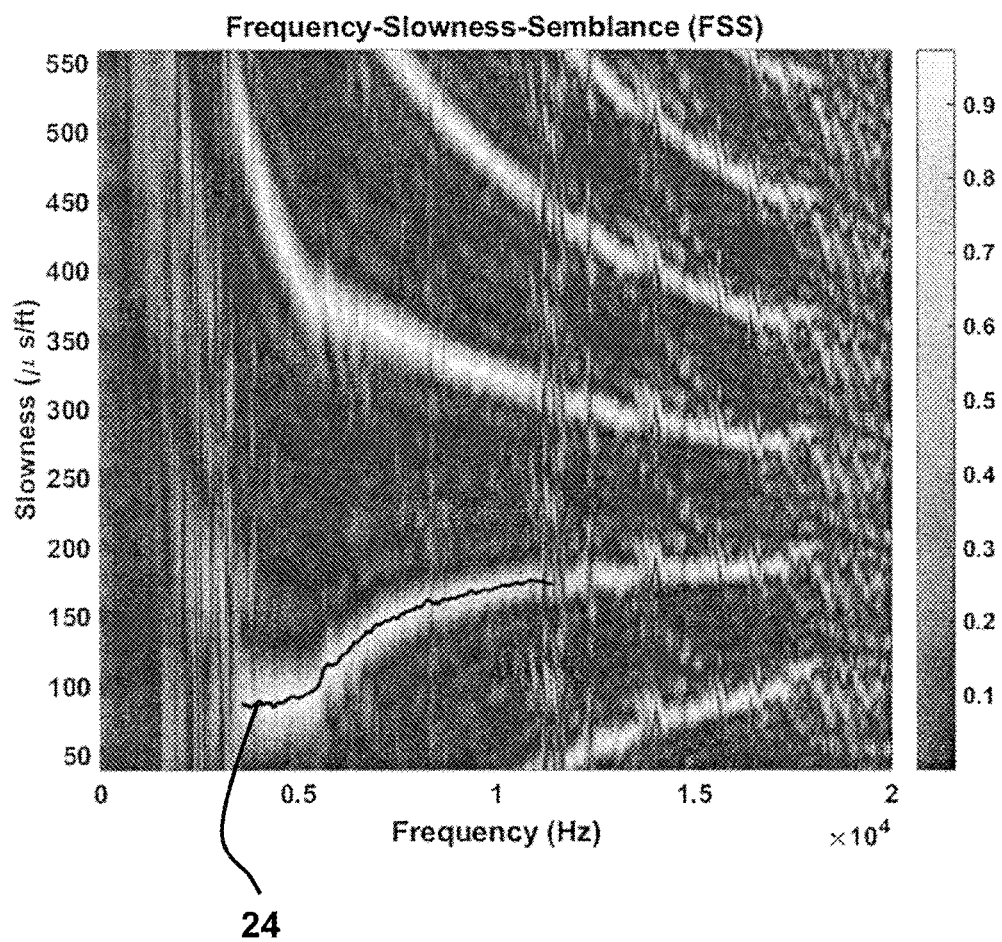
FIG. 4 is a Slowness-Frequency-Coherence plot produced in accordance with a basic version of the method of the present disclosure.

FIG. 4 shows the same receiver outputs as FIGS. 2a and 2b, processed according to a WSS dispersion extraction method. The onset of the low-frequency asymptote is around 3 kHz, which is well below the 5-kHz to 7-kHz frequency band that contains most of the signal's energy apparent in FIG. 2b.

A. Logging Tool and Its Deployment and Use

As explained, FIG. 1a shows one form, of several known in the art, of acoustic logging tool 10. Such a tool 10 may be used to carry out the method of the present disclosure and following appropriate programming of its programmable parts or programmable device associated with it may constitute or form part of apparatus according to the present disclosure.

As is known in the logging tool art, the logging tool 10 includes one or more sources 11 of acoustic energy pulses. In the illustrated embodiment these are a monopole source 11a that is spaced along the cylindrical interior of the logging tool from X- and Y-direction dipole sources 11b, 11c that together define a cross-dipole source. In some embodiments sources 11b and 11c are co-located. The sources 11 form part of an elongate, cylindrical sonde (logging tool) 10 that as illustrated in FIG. 1b may be inserted into a borehole 13 that penetrates a subterranean formation 14.

Spaced along the logging tool 10 in FIGS. 1a and 1b from the sources 11 is an array 16 of receivers as described above. These may adopt any of a range of per se known detector forms and as far as this is possible are acoustically isolated from the sources 11 by way of acoustic isolator 17. The aim of including the acoustic isolator is to minimize the acoustic energy that is transmitted directly via the material of the logging tool from the sources 11 to the receivers 16.

The logging tool 10 may include one or more processors 18a that effect several of the steps of the present disclosure. Such processors are programmable and are programmed to carry out the method steps. The processor(s) 18 may constitute or include non-transitory computer-readable storage means including computer-readable instructions for putting the method of the present disclosure into effect.

The logging tool 10 may in this sense be autonomous such that the generation and processing of log data may take place entirely while the logging tool 10 is in use in a borehole. In such a case the log data may be downloaded after recovery of the logging tool to a surface location following its deployment and use.

The logging tool thus may be of a type that includes a memory 18c. This can record log data or underlying signal data that can be downloaded to a remote computer 18b once the logging tool 10 reaches an accessible location, typically after the desired logging activity has been completed. The latter may carry out the calculation steps on them or may display or transmit logs generated within the logging tool. The remote processor is illustrated in the form of a personal computer, but may take a wide range of forms as will be known to the person of skill in the art.

The remote processor 18b may carry out some, none or all of the calculation steps of the method of the present disclosure. The remote processor 18b may include a computer-readable storage means of the kind contemplated herein. In FIG. 1b the computer-readable storage means takes the form of a DVD or other disk 18d or another solid state device that contains e.g. program instructions for carrying out methods as specified herein, and/or data derived from log signals following performance of one or more such methods. Numerous other types of computer readable medium are also possible within the scope of the present disclosure, including but not limited to combinations of medium types. In any of the cases contemplated herein the remote computer 18b when present is capable of sending commands, based on instructions in the computer-readable medium 18d, to the logging tool that is designed to respond to such commands.

In another embodiment of the present disclosure, the logging tool may be capable of communicating with a processor 18b that is located remotely from it, typically at a surface location. This may be by way of a wireline connection 15 as illustrated, or through the generation of coded mud pulse signals that allow data telemetry via the mud that typically fills the borehole between the logging tool and the borehole wall. When wireline is used in accordance with the method and apparatus of the present disclosure various ancillary components, such as but not limited to the illustrated wireline drum 19, pulley and derrick 20, may be employed in order to assist deployment and operation of the logging tool 10. Such aspects of the present disclosure are known per se in the art.

The logging tool 10 may be of a type that is associated with borehole drilling equipment in a manner that permits so-called "logging while drilling" (LWD) in respect of the borehole.

All such variants on the basic logging tool design, and the use of them, are within the scope of the present disclosure.

Regardless of the exact form of logging tool 10 adopted, the method of operating it to record log data involves conveying the logging tool 10 to a downhole location. This may be at or near the total depth of the borehole, or it may be at a position intermediate the surface termination of the borehole and the total depth, depending on the logging requirement.

Following or during such deployment at each of a plurality of logging depths the source is activated, typically so as to produce acoustic excitation of the borehole fluid in ways as summarized above. Also as mentioned above this results in the generation of acoustic waves in the rock of the formation 14. Such waves propagate through the rock to the receiver array 16, in ways that are known in the art. In addition interface waves such as Stoneley waves travel along the borehole wall. Receipt of the waves at the receivers 16 activates them in ways that generate electrical signals. These are indicative of the received waves in terms of timing, amplitude and frequency.

The logging tool 10 is gradually conveyed towards the surface termination of the borehole 13 and completes logging activity at each of a plurality of logging depths. The inversion method of the present disclosure may be carried out on the log data generated at each such depth; or on data captured at a selected number of such depths (such as every $N^{th}$ depth). In general the method proceeds from the deepest logging depth towards the uphole, surface termination of the borehole.

FIG. 2a shows the output signal voltages of each of the receivers of an eight-receiver array plotted against time, although other numbers of receivers are possible within the scope of the present disclosure. FIG. 2b shows the same data transformed so as to show the signal amplitudes 21' for all eight receivers as a function of frequency, and the corresponding summation 21 described above.

Since the receivers contemplated in FIG. 2a are spaced at increasing distances from the sources 11, it takes successively longer for each receiver in turn to be activated by each wave head. Also the amplitude of each wave feature decreases slightly from one receiver in the array 16 to the next, as attenuation of the wave energy occurs during the transit across the receiver array 16. As is familiar in the acoustic logging art, the principal waves that are received at the receivers 16 are, in order of arrival, the formation compressional wave, the formation shear wave (if generated—see above) and the Stoneley wave.

It is known from U.S. Pat. No. 5,278,805 and US 2015/0301213 to model dispersion curves and use STC-derived shear as an input to a comparison algorithm. Operating this iteratively eventually identifies the modelled dispersion curve that most closely matches the STC-derived shear. This modelled curve can be taken as the dispersion map from which shear slowness is derived.

Techniques such as those described in the foregoing references however suffer from numerous disadvantages, the first of which is that it is necessary to adjust the borehole parameters and the shear slowness in order to achieve a good match. Moreover although the analytical model operates at a relatively high speed the need for a large number of iterations means that at each logging depth interval it may take several seconds to establish the shear slowness. The present disclosure was developed in part with the aim of improving the processing time required to establish slowness values.

The output signals of the receivers 16 undergo considerably faster processing in accordance with the method of the present disclosure, as described below. Such processing involves the transformation of the signals from acoustic to image, data array, electrical or another displayable, transmissible and/or storable form by way of the method of the present disclosure.

B. Processing Method of the Present Disclosure

Figure 10:
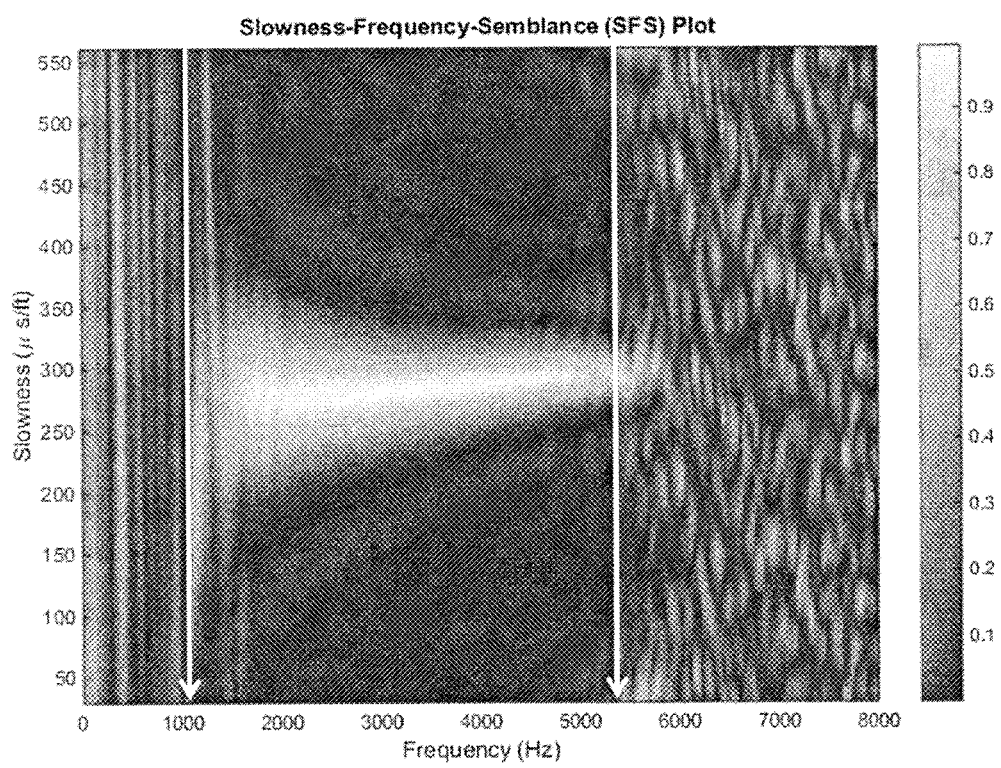
FIG. 10 is a Slowness-Frequency-Semblance plot showing the selection of a frequency band in accordance with the method of the present disclosure.

The receiver output signals 20 are converted to the frequency domain and a slowness-frequency-semblance map, as shown in FIG. 10, generated. In the example illustrated the frequency domain conversion is carried out using a WSS method although as noted other methods of extracting semblance information are available. One alternative in the form of a matrix pencil method is disclosed herein.

FIG. 10 is a visible form of frequency-semblance map but as will be known to the person of skill in the art such a map may exist in various alternative forms (that are not necessarily intended for visual inspection).

The illustrated slowness-frequency plot of FIG. 10 is shaded in a way that indicates high and low levels of coherence. In the figures hereof the various semblance maps are rendered in greyscale, which means that certain shadings may be used to signify more than one level of semblance. In a practical semblance plot a unique color is used for each level of semblance, and neither greyscale rendering nor re-using of shading types occurs.

The semblance map of FIG. 10 is used to determine the frequency band over which the signals are processed. In particular as signified by the two arrows in FIG. 10 the lower and upper frequency cut-offs correspond to a spectrum of coherent activation frequencies of the receivers of the logging tool 10 on arrival of the head waves as described.

Following selection of the frequency band limits a field dispersion curve is generated from a semblance plot such as FIG. 10. This is achieved in the preferred embodiment of the present disclosure by peak-picking the locations in the plot of maximum semblance. These can be plotted to create a field dispersion curve, as further described below.

In accordance with the method of the present disclosure, an artificial neural network (referred to herein as a "neural net" as mentioned in FIG. 9) is then used to find the formation shear slowness that is consistent with the field dispersion curve.

The neural net is an artificial neural network that has been trained on a large number (in practice hundreds of thousands) of modelled dispersion curves that have been quality controlled to remove "bad" curves. (Neural nets can have a characteristic of reversal, in that the process that generates outputs from inputs may be reversed such that the quantities previously identified as outputs are used as inputs in the reverse process, and the properties previously identified as inputs become the outputs. The present disclosure exhibits this characteristic such that the inputting of slowness-frequency-semblance data generates shear slowness values; and the inputting of those shear slowness values generates the dispersion curve in a reverse of the shear slowness determination step. In the preferred embodiment the neural net is operated in the way that allows shear slowness to be returned upon input of the field dispersion curve. In another embodiment it is used to create a synthetic dispersion curve that most closely matches the field dispersion curve.)

Creation of the synthetic dispersion curve at each logging depth at which calculation occurs then takes place. In one embodiment of the present disclosure this is on the basis of the Levenberg-Marquart least squares fitting algorithm seeded with the shear slowness value from the immediately preceding calculated depth, although numerous other methods are possible.

The form of the Levenberg-Marquart equation is:

$$\hat{S} \triangleq \min \Sigma \|S_{field} - S_{syn}\|_2^2$$

This method requires the inputting of an initial shear slowness value in respect of the first depth to be calculated (i.e. the furthest logging depth measured from the surface location). In this case an STC estimate of shear slowness is used. Subsequent shear slowness seed values as indicated are taken from the calculations preceding the prevailing calculation. The slowness of the mud (which usually is calculable based on a mud wave arrival that is detectable at the receivers 16 of the logging tool 10) is used as a parameter to determine the fit of the synthetic dispersion curve generated by the neural net. Mud slowness has one purpose only in this context: it is one of the parameters that controls the shape and position of the dispersion curve (along with mud density, bit size and formation and tool properties), and hence is an input in the neural net. Typically the dependence on mud slowness is weak.

The synthetic shear slowness curve resulting from the curve fitting technique described may be saved, transmitted, printed, further processed or otherwise made use of.

One way in which the slowness curve from the present disclosure may be employed is in a comparison with an STC shear slowness plot at the same logging depth. An STC correction can be calculated as a result. Some comparisons between the shear slowness curves calculated in accordance with the method of the present disclosure and the counterpart STC shear slowness curves are presented below.

As mentioned, the method of the present disclosure may be carried out in respect of each of a series of logging depths, or optionally in respect of each $N^{th}$ depth. In the latter case the resulting synthetic shear slowness curve may be compared with an STC shear slowness curve as mentioned in order to generate an STC dispersion correction curve. In such a case the quality and nature of the correction would be dictated by the attributes of the STC plot but this approach has the advantage of providing good backward compatibility.

The method of the present disclosure includes various refinements that are employed to enhance the slowness dispersion curves that are generated. These are discussed in the following section.

C. Method Refinements

One problem associated with prior art curve-fitting techniques that are used to match modelled curves against field semblance plots is that resolution limitations combined with noise in the receiver signals makes it hard to identify the peaks of semblance. In particular the region of the field curve around the peak may be flat, and hence ambiguous; there may be multiple peaks; or the peak region may be asymmetric, making it hard to fit a curve to the peak and thereby identify the true peak semblance value.

The method of the present disclosure addresses this aspect by interpolating between peak semblance values at each of a range of frequencies and fitting a smooth curve in order to avoid the kinds of ambiguity mentioned above.

Figure 6:
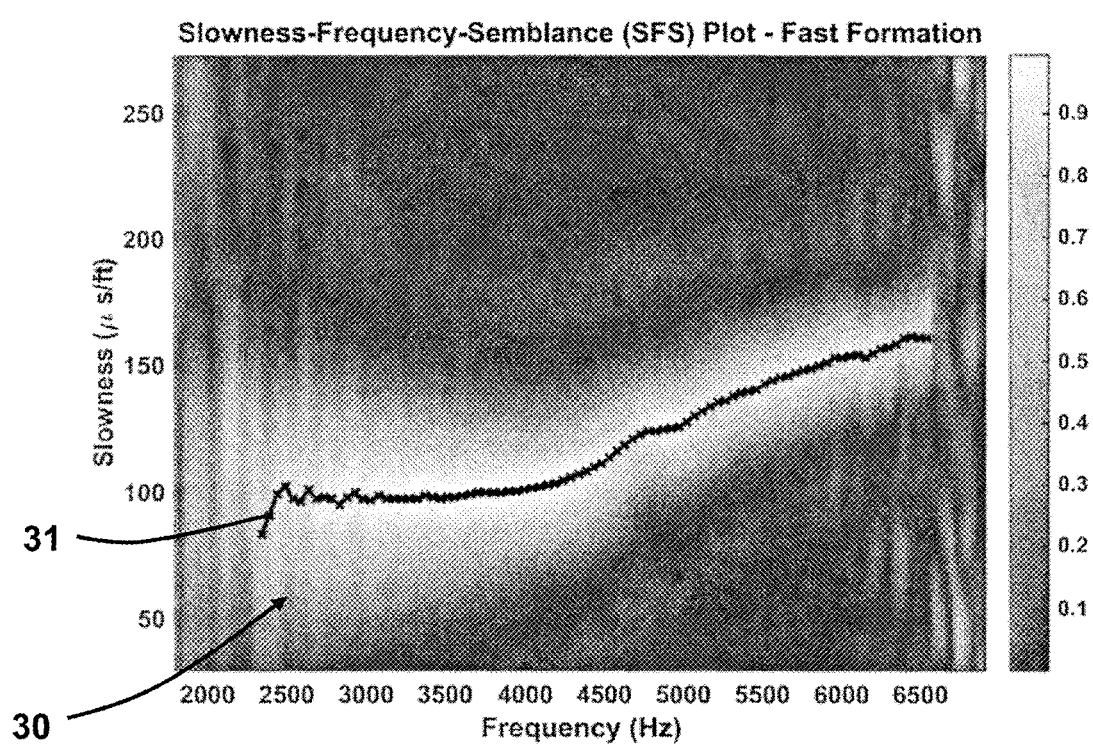
FIG. 6 illustrates the result of peak picking in accordance with the present disclosure in the case of a fast formation.

This is best illustrated with reference to FIGS. 6-8, of which FIG. 6 shows an enlargement of part of a Slowness-Frequency-Coherence plot in which the coherence values are represented by shading 30. The black line 31 marked on the plot indicates picked coherence peaks. As is apparent the line joining the picked peaks is not smooth, as a result of ambiguities in the identification of true peak values as explained above.

Figure 7:
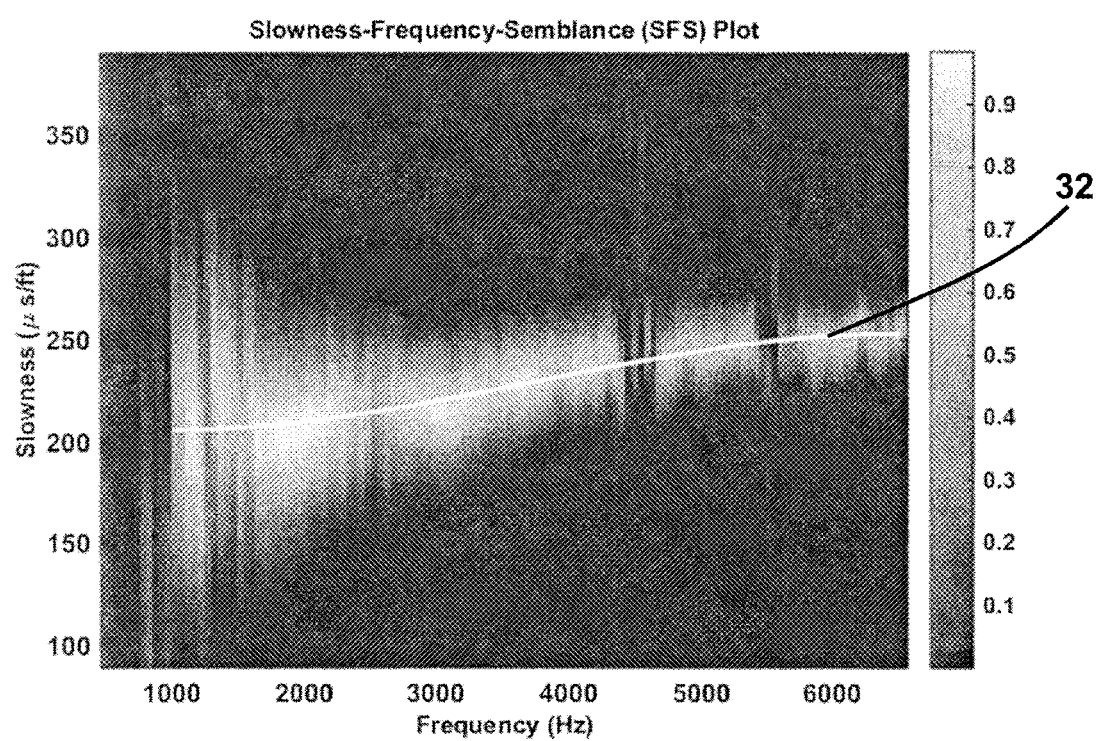
FIG. 7 shows an improved Slowness-Frequency-Semblance plot that can be achieved in accordance with an aspect of the present disclosure involving the use of an SLM algorithm to smooth the picked coherence points.
Figure 8:
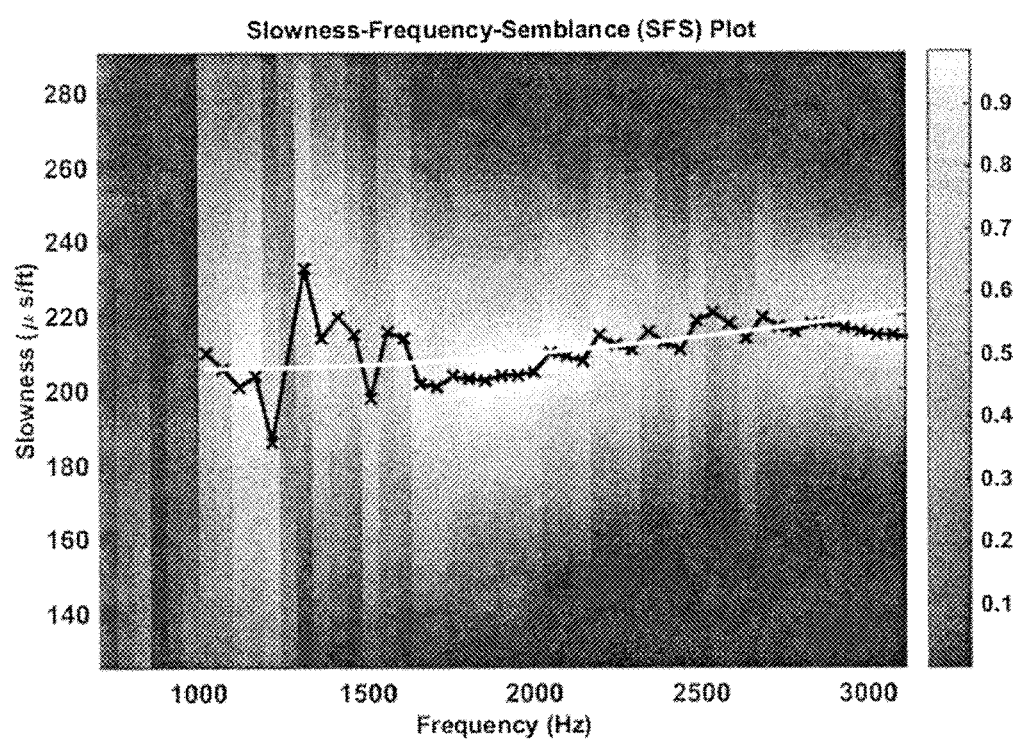
FIG. 8 is another a Slowness-Frequency-Semblance plot, in finer resolution than FIG. 7, further showing the advantages of smoothing of the peak-picked semblance curve.

The white line 32 in FIG. 7, which is based on similar log data to FIG. 6, represents a smooth curve fitted by interpolation between peaks.

The preferred method of fitting a smooth curve involves the operation of an SLM algorithm. The benefit of this approach is further illustrated with reference to FIGS. 7 and 8. FIG. 8 shows the result of peak picking, without smoothing, over part of the semblance plot shown in FIG. 7. FIG. 8 also shows the effect on the same section of semblance plot of smoothing using the SLM algorithm. The peak-picked slowness-frequency curve appears stochastic in FIG. 8 whereas the smoothed curve is considerably smoother and hence more easily viewed, interpreted and processed.

The SLM algorithm is of particular assistance in slow formations in which the field dispersion curve is highly likely to be contaminated by Stoneley energy and the shape of the curve is imperfect.

The SLM algorithm recognizes two scenarios: one in which high frequencies are absent (as is typical in slow formations); and one in which high and low frequencies are present (as is typical of fast formations).

In the first of these cases, the SLM algorithm is constrained using a concave-up constraint. In the second case the inflexion point is identified from the peaks and a monotonic, increasing and concave-up constraint is applied form low frequencies up to the inflexion point; and a monotonic, increasing and concave-down constraint applied beyond the inflexion point.

In connection with the foregoing, it is known in the art that flexural mode and Stoneley mode dispersion curves have a sigmoidal or "S"-shape, hence the references to concave-up and concave-down shape constraints. These concepts are known by those of skill in the art.

A peak smoothing approach also can address uncertainty over the slowness values that can arise at low frequencies.

Figure 5:
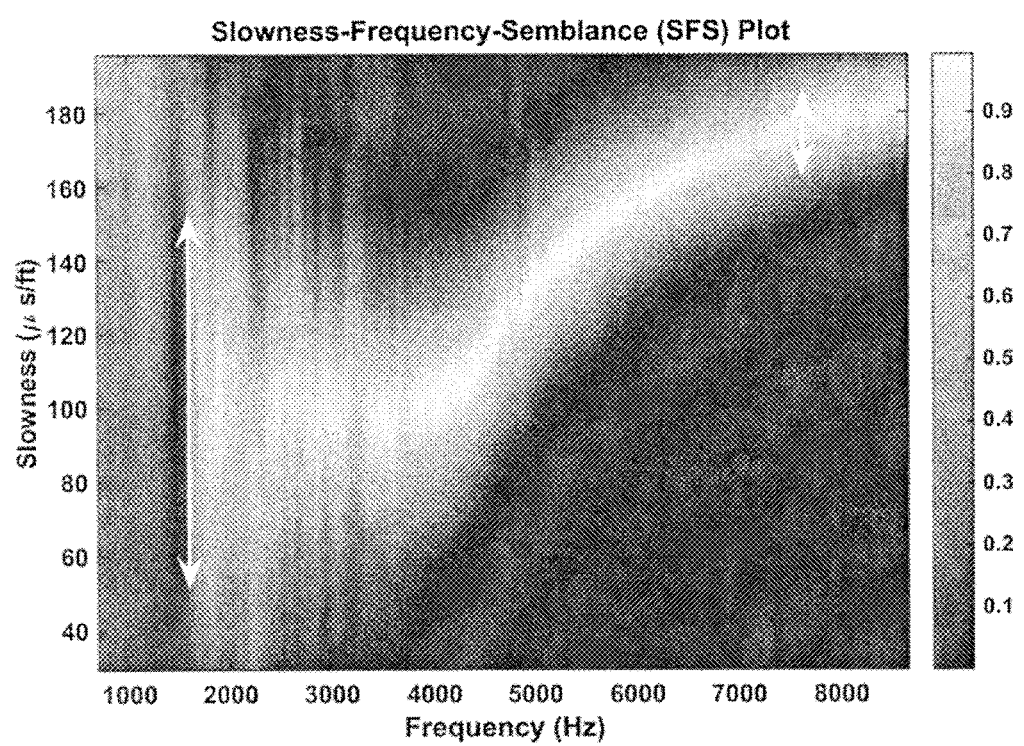
FIG. 5 is a Slowness-Frequency-Semblance plot showing the levels of resolution that may be achieved using WSS field dispersion selection in accordance with the method of the present disclosure.

This problem is illustrated in FIG. 5, in which the Slowness-Frequency-Semblance plot of a fast formation at frequencies that avoid Stoneley contamination nonetheless becomes indistinct at low frequencies, which correspond to long wavelengths. In particular when using a cross-dipole source the sampling increments and recording times may be such that insufficient samples are acquired accurately to represent the long wavelengths. The use of a smoothing algorithm assists in addressing such aspects.

Respective arrows have been artificially added to the low and high frequency regions of FIG. 5. The low frequency arrow is more than three times longer than the high-frequency arrow, thus exemplifying some of the problems that can arise in SFS plots.

As mentioned above in relation to FIG. 4, aliases and other spurious features are often apparent in the Slowness-Frequency-Semblance plots. If the method of the present disclosure was to perform calculations in respect of an incorrect (but seemingly plausible) region of the plot an inaccurate output would result.

The method of the present disclosure addresses this potential difficulty by applying a mask to the Slowness-Frequency-Coherence plot that as noted is an important aspect of the inventive method.

The x- and y-axis positioning and the dimensions of the mask in respect of a current inversion are determined with reference to the peak semblance value of the immediately preceding inversion in order to assure that spurious regions of the plot are excluded. The detail of how to position and select the height of the mask is explained by the following steps: The step (a) of deriving a field dispersion curve comprises the step of (a1) extracting dispersion information from the transformed acoustic log signals using one or more technique selected from the list including a weighted spectral semblance (WSS) method, Prony's method, Backward and Forward Extended Prony, Matrix Pencil, Maximum Entropy (ARMA), Predictive Array Processing, Maximum Likelihood, Non-Parametric, Homomorphic Processing, differential Phase Processing and Amplitude & Phase Estimation (APES) methods in order to generate a field frequency semblance map containing a frequency semblance curve including the step of (j) using a mask to isolate a region of the field frequency semblance map of interest in order to eliminate the risk of picking of coherence peaks derived from aliases or other unwanted modes in the field frequency semblance map; and further including the step of (k) selecting the position of the mask based on a preceding field dispersion curve; (k1) defining the mask as a pair of frequencies and a pair of slownesses; (k2) for the first depth only, identifying the mode of interest and defining the frequency range of the observed signals for that mode; (k3) computing a slowness range as the estimated slowness+/− delta μs/ft, where the slowness is estimated from the formation properties at that depth; and (k4) for all depths after the first, taking frequency range as the range associated with coherence values above a pre-defined threshold, and the slowness range as the estimated slowness+/−delta.

The detail of how to position and select the height of the mask is explained by the following steps: The step (a) of deriving a field dispersion curve comprises the step of (a1) extracting dispersion information from the transformed acoustic log signals using one or more technique selected from the list including a weighted spectral semblance (WSS) method, Prony's method, Backward and Forward Extended Prony, Matrix Pencil, Maximum Entropy (ARMA), Predictive Array Processing, Maximum Likelihood, Non-Parametric, Homomorphic Processing, differential Phase Processing and Amplitude & Phase Estimation (APES) methods in order to generate a field frequency semblance map containing a frequency semblance curve and including the step of (j) using a mask to isolate a region of the field frequency semblance map of interest in order to eliminate the risk of picking of coherence peaks derived from aliases or other unwanted modes in the field frequency semblance map, wherein the height of the mask is determined from a preceding value of formation shear slowness determined in accordance with the method of the present disclosure. (Terms such as "position" and "height" in this context will be understood by the skilled reader.)

Yet a further problem that can arise is the absence of a clear asymptote for the smoothed coherence curve, or a distorted asymptote as illustrated by the tick shape to the smoothed curve in FIG. 6. The impact of such distortions on determining the matching smooth dispersion curve is mitigated by selection of an appropriate data-specific frequency range for the calculations.

D. Neural Net

The neural net used to implement the method of the present disclosure in experimental work was implemented as a multi-layer, perceptron-based network. Thus, the neural net is embodied as appropriately programmed computer hardware that is capable of transforming the electrical signals generated by the logging tool 10 in accordance with the method of the present disclosure. The neural net was trained using a large number (several hundred thousand) of synthesized dispersion curves having a range of caliper (i.e. borehole size), mud density, mud compressional slowness, formation density, formation compressional slowness and formation shear slowness parameters.

When, as explained above, the method of the present disclosure is carried out at every logging depth of a set of log data, the shear slowness value may be directly generated. When in the alternative the inversion is performed at every $N^{th}$ logging depth an STC plot is additionally generated and an STC error curve created through comparison between the shear slowness curve produced using the method of the present disclosure and the STC curve.

The error curve may in addition if desired be produced even in the case of inverting the acoustic log data at every logging depth. This clearly illustrates the improvement in accuracy of the method of the present disclosure over the STC method when the latter is practiced on its own.

Figure 9:
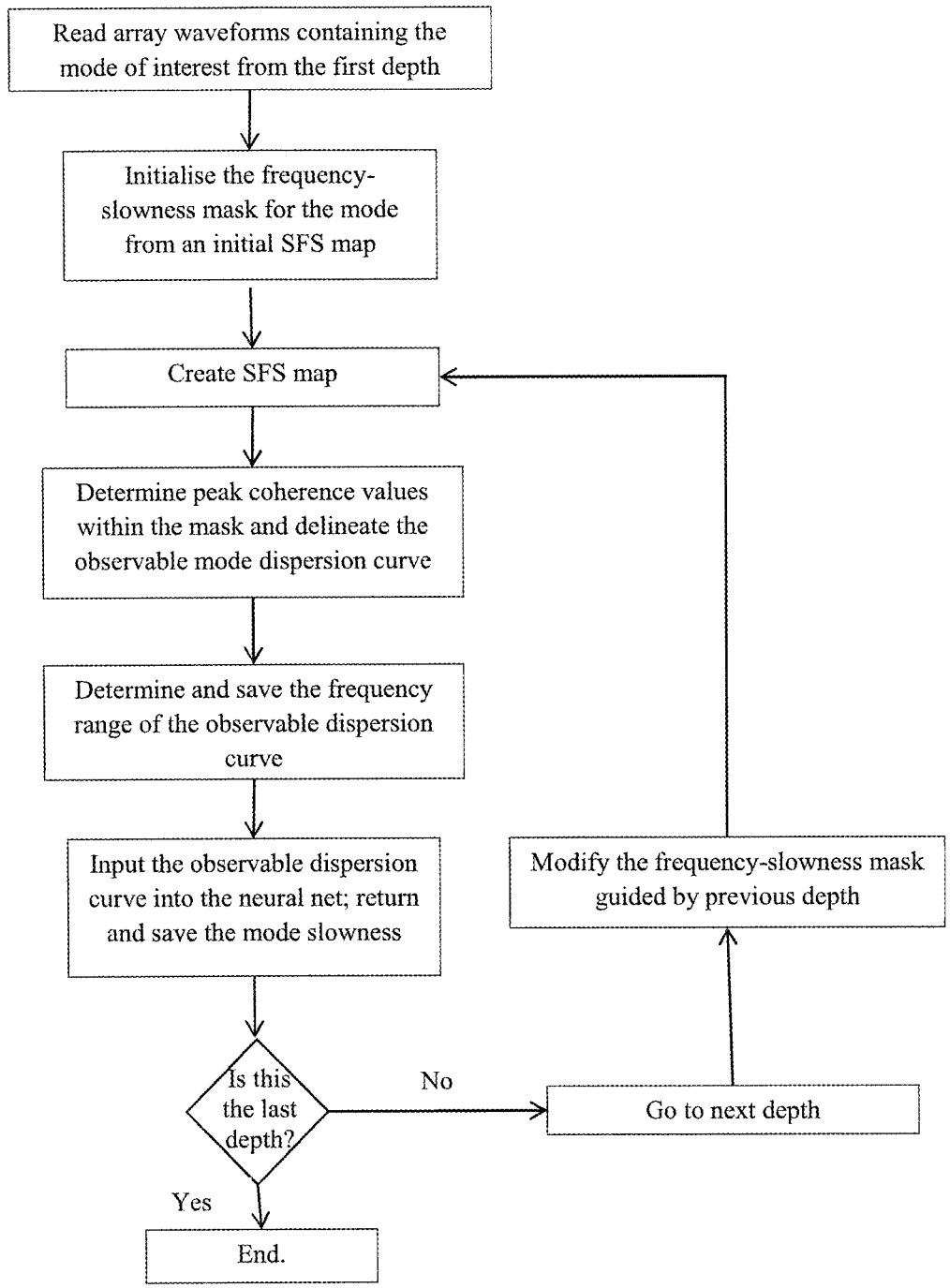
FIG. 9 is a flowchart showing the basic steps in the method of the present disclosure.

FIG. 9 summarizes the method employed by the neural net. Since this is presented in intuitive English it does not require further detailed describing herein except to mention that the steps of FIG. 9 are carried out using the computer hardware forming part of the neural net.

The neural net when operated in the direction indicated in FIG. 9 generates the shear slowness values in a single step, without any need for iteration. As a result the computing time needed to derive shear slowness values from the log data is significantly reduced compared with the prior art. This is a significant advantage of the present disclosure over the prior art.

E. SFS Plot Scale Conversion

Should it be required to read the SFS plots of FIGS. 3 to 8 using metric scale units, the following conversions may be applied:

1. FIG. 3. The conversion from microseconds/ft to microseconds/m is 1/0.3048. So the scale 50-550 microseconds/ft becomes 165 to 1805 microseconds/m to the nearest 5 microseconds/m.
2. FIG. 4. As FIG. 3
3. FIG. 5. As above. 40 and 180 microseconds/ft translate to 130 and 590 microseconds/m respectively
4. FIG. 6. As above. 50 and 250 microseconds/ft translate to 165 and 820 microseconds/m respectively
5. FIG. 7. As above. 100 and 350 microseconds/ft translate to 330 and 1150 microseconds/m respectively
6. FIG. 8. As above. 140 and 280 microseconds/ft translate to 460 and 920 microseconds/m respectively F. Field Results FIGS. 11a and 11b are examples of field log data sets that have been inverted in accordance with the method of the present disclosure and/or using apparatus according to the present disclosure.

Figure 11A:
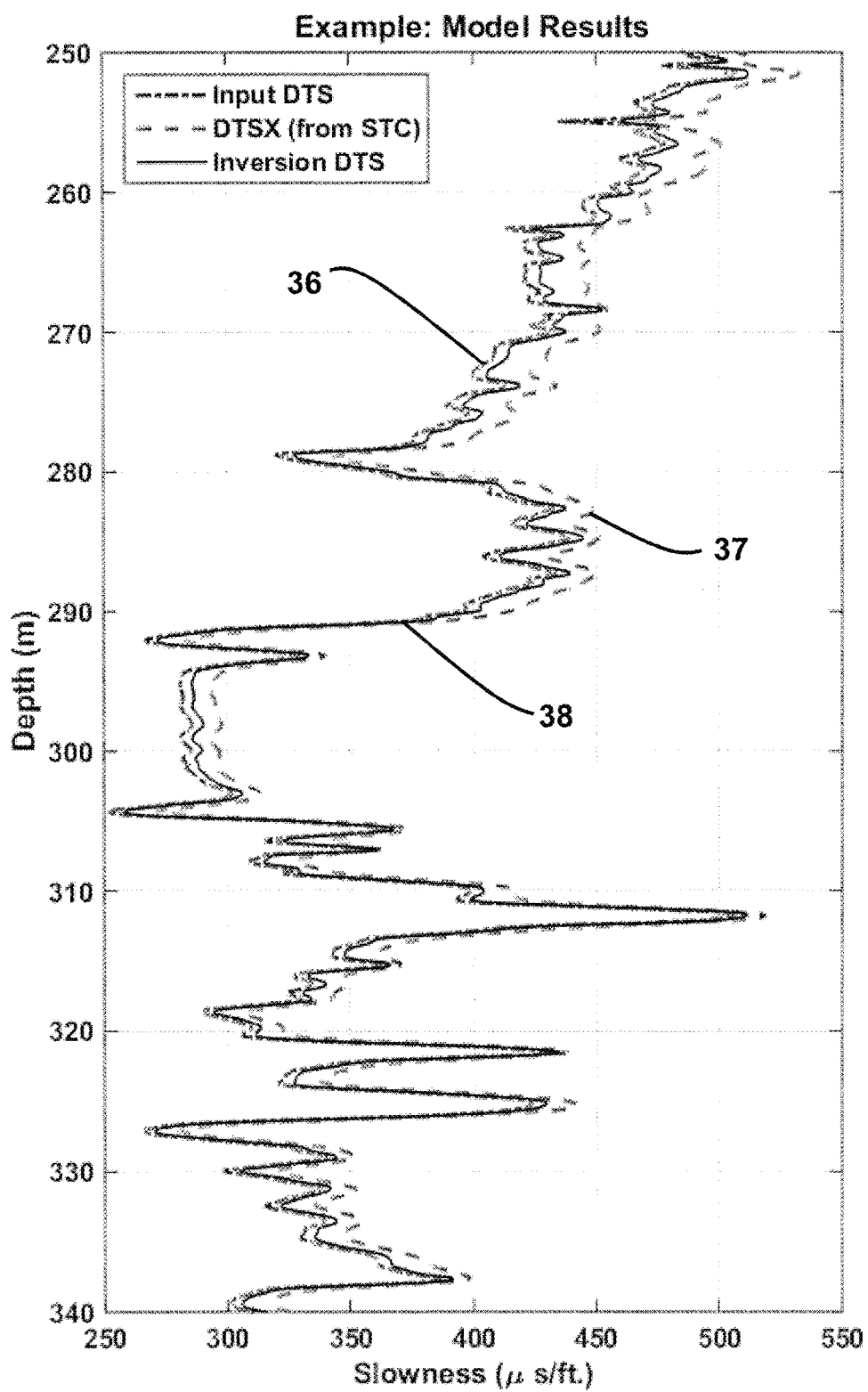
FIGS. 11a and 11b are illustrations of slowness logs generated in accordance with the method of the present disclosure, and using apparatus according to the present disclosure, including comparisons with STC logs generated using the same log information.
Figure 11B:
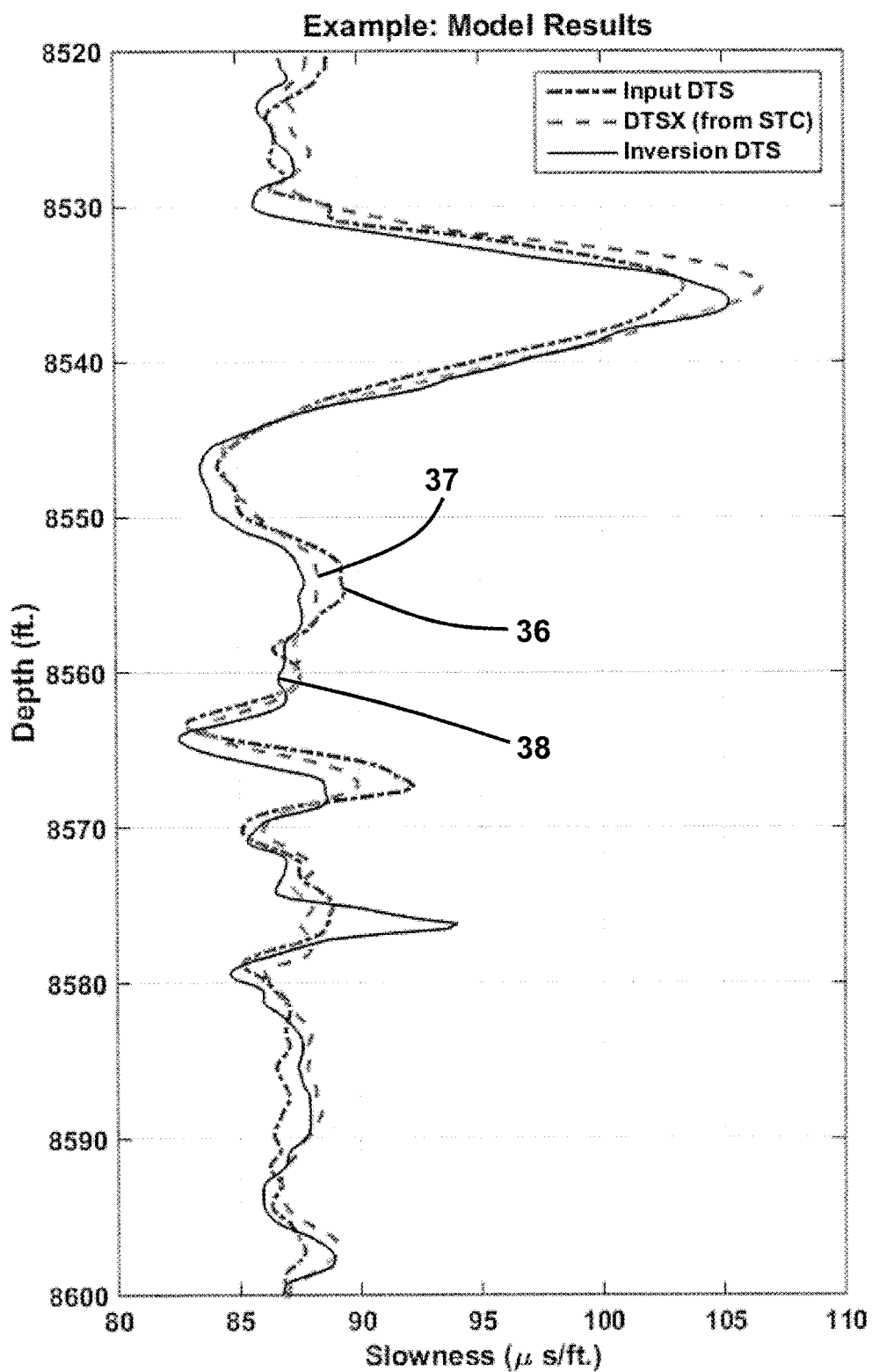

In each of FIGS. 11a and 11b, slowness is plotted against borehole depth. The chain line 36 represents a synthetic input slowness curve generated using a per se known synthesis method and according to the parameters of a chosen well. The dotted line 37 shows the shear slowness generated by STC, according to the same parameters; and unbroken line 38 illustrates the effect of inversion according to the present disclosure.

As is apparent from the field data results, the method of the present disclosure produces slowness curves that closely follow the input data, and represent in several cases a significant correction compared with the STC slowness curves.

As regards the specifications of the borehole, the inventors have found that the method of the present disclosure scales to encompass as broad a range of borehole parameters as can be responded to by the logging tool 10 chosen to implement the logging parts of the method of the present disclosure. Thus the scope of the method is not limited by the signal processing/transformation steps.

G. Apparatus

Apparatus for carrying out the method of the present disclosure in appearance is similar to that illustrated in FIGS. 1a and 1b. Thus, a logging tool 10 includes one or more acoustic sources 11. These may be or include dipole, quadrupole or multi-pole sources or combinations thereof and a receiver array 16 is spaced along the logging tool 10 from the source 11. The receiver array is acoustically isolated from the source 11 as much as possible, through use of an isolator 17 the design of which may be of a known kind.

The detectors constituting the receiver array 16 are of a kind that generate electrical signals when stimulated by acoustic wave energy.

The logging tool 10 as explained may include a processor 18*a* that carries out the method of the present disclosure, or it may be of a type that transmits the outputs of the receiver array to a remote processor 18*b* such that the latter performs the inversion steps. The logging tool also may include an on-board memory 18*c*. The latter may record or store e.g. the output signals of the receiver array 16 (or data points representative of them), or may record or store the shear slowness values resulting from inversion according to the method of the present disclosure.

The apparatus of the present disclosure may include e.g. as part of the logging tool 10 or as a separate component such as a computer disk, memory medium or similar 18*d*, a non-transitory computer-readable storage medium storing computer-readable instructions for estimating the shear slowness of a subterranean formation which, when implemented by a processor, cause the processor to implement a method comprising, for each of a plurality of inversion depths of a well at which logging of data occurs or has occurred, carrying out the steps of (a) processing in the frequency domain a plurality of acoustic log signals representative of waveforms received at a plurality of acoustic well logging receivers to give rise to one or more flexural or Stoneley mode field dispersion curves; (b) operating a neural net to generate one or more formation shear slowness values from either the flexural or Stoneley mode field dispersion curves and (c) saving, transmitting, plotting, printing or processing one or more resulting signals that are indicative of shear slowness values.

Overall, the methods and apparatuses of the present disclosure address numerous outstanding problems in the acoustic logging art, and provide beneficial advances in the inversion of acoustic log data to generate shear slowness information.

The listing or discussion of an apparently prior-published document in this specification should not necessarily be taken as an acknowledgement that the document is part of the state of the art or is common general knowledge.

Preferences and options for a given aspect, feature or parameter of the present disclosure should, unless the context indicates otherwise, be regarded as having been disclosed in combination with any and all preferences and options for all other aspects, features and parameters of the present disclosure.

What is claimed is:

1. An apparatus for carrying out acoustic logging to prospect for minerals in a subterranean formation intersected by a well, the apparatus comprising:
    a logging tool having at least one activatable source of acoustic waves;
    spaced and acoustically isolated therefrom in the logging tool, a plurality of acoustic well logging receivers configured to detect acoustic wave energy that on the detection of acoustic wave energy is capable of generating one or more electrical or electronic log signals that are characteristic of acoustic energy waves detected; and
    at least one processing device associated with or forming part of the logging tool, wherein for each of a plurality of inversion depths of the well at which logging of data occurs or has occurred in generally anisotropic rock formations, the at least one processing device is configured to:
    obtain a plurality of acoustic log signals received at the plurality of acoustic well logging receivers;
    process in the frequency domain the plurality of acoustic log signals representative of waveforms received at the plurality of acoustic well logging receivers to give rise to one or more flexural or Stoneley mode field dispersion curves, the at least one processing device being configured to:
        extract dispersion information from the transformed acoustic log signals using one or more techniques in order to derive a field dispersion curve and to generate a field frequency semblance map containing a frequency semblance curve; and
        apply a shape language model (SLM) algorithm during generation of the field frequency semblance map whereby to reduce or eliminate one or more artefacts selected from the list including noise in the field slowness-frequency semblance map values; ambiguity in aspects of the slowness values in the field slowness-frequency semblance map at low frequencies; the absence and/or distortion of an asymptote of the slowness-frequency semblance in the field slowness-frequency semblance map; and/or discontinuities in the field frequency semblance curve;
    operate a neural net to generate one or more formation shear slowness values from either the flexural or Stoneley mode field dispersion curves; and
    process one or more resulting signals that are indicative of the one or more formation shear slowness values to image at least a portion of the subterranean formation.

2. A non-transitory computer-readable storage medium storing computer-readable instructions for estimating the shear slowness of a subterranean formation which, when implemented by a processor, cause the processor to:
    obtain a plurality of acoustic log signals received at a plurality of acoustic well logging receivers of an acoustic logging tool in a well of the subterranean formation;
    process in the frequency domain the plurality of acoustic log signals representative of waveforms received at the plurality of acoustic well logging receivers to give rise to one or more flexural or Stoneley mode field dispersion curves, the processor being configured to:
        extract dispersion information from the transformed acoustic log signals using one or more techniques in order to derive a field dispersion curve and to generate a field frequency semblance map containing a frequency semblance curve; and
        apply a shape language model (SLM) algorithm during generation of the field frequency semblance map whereby to reduce or eliminate one or more artefacts selected from the list including noise in the field slowness-frequency semblance map values; ambiguity in aspects of the slowness values in the field slowness-frequency semblance map at low frequencies; the absence and/or distortion of an asymptote of the slowness-frequency semblance in the field slowness-frequency semblance map; and/or discontinuities in the field frequency semblance curve;

operate a neural net to generate one or more formation shear slowness values from either the flexural or Stoneley mode field dispersion curves; and process one or more resulting signals that are indicative of the one or more formation shear slowness values to image at least a portion of the subterranean formation.

3. An apparatus for carrying out acoustic logging to prospect for minerals in a subterranean formation intersected by a well, the apparatus comprising:

a logging tool having at least one activatable source of acoustic waves;

spaced and acoustically isolated therefrom in the logging tool, a plurality of acoustic well logging receivers configured to detect acoustic wave energy that on the detection of acoustic wave energy is capable of generating one or more electrical or electronic log signals that are characteristic of acoustic energy waves detected by the one or more detector of acoustic wave energy; and at least one processing device associated with or forming part of the logging tool, wherein for each of a plurality of inversion depths of the well at which logging of data occurs or has occurred in generally anisotropic rock formations, the at least one processing device is configured to:

obtain a plurality of acoustic log signals received at the plurality of acoustic well logging receivers;

process in the frequency domain the plurality of acoustic log signals representative of waveforms received at the plurality of acoustic well logging receivers to give rise to one or more flexural or Stoneley mode field dispersion curves, wherein the at least one processing device is configured to:

extract dispersion information from the transformed acoustic log signals using one or more techniques in order to derive a field dispersion curve and to generate a field frequency sem blance map containing a frequency semblance curve including using a mask to isolate a region of the field frequency semblance map of interest in order to eliminate the risk of picking of coherence peaks derived from aliases or other unwanted modes in the field frequency semblance map;

select the position of the mask based on a preceding field dispersion curve;

define the mask as a pair of frequencies and a pair of slownesses;

for the first depth only, identify the mode of interest and defining the frequency range of the observed signals for that mode;

compute a slowness range as the estimated slowness+/−delta µs/ft, where the slowness is estimated from the formation properties at that depth; and for all depths after the first, take frequency range as the range associated with coherence values above a pre-defined threshold, and the slowness range as the estimated slowness+/−delta;

operate a neural net to generate one or more formation shear slowness values from either the flexural or Stoneley mode field dispersion curves; and process one or more resulting signals that are indicative of the one or more formation shear slowness values to image at least a portion of the subterranean formation.

4. A non-transitory computer-readable storage medium storing computer-readable instructions for estimating the shear slowness of a subterranean formation which, when implemented by a processor, cause the processor to:

obtain a plurality of acoustic log signals received at a plurality of acoustic well logging receivers of an acoustic logging tool in a well of the subterranean formation;

process in the frequency domain the plurality of acoustic log signals representative of waveforms received at the plurality of acoustic well logging receivers to give rise to one or more flexural or Stoneley mode field dispersion curves, the processor being configured to:

extract dispersion information from the transformed acoustic log signals using one or more techniques in order to derive a field dispersion curve and to generate a field frequency semblance map containing a frequency semblance curve including using a mask to isolate a region of the field frequency semblance map of interest in order to eliminate the risk of picking of coherence peaks derived from aliases or other unwanted modes in the field frequency semblance map;

select the position of the mask based on a preceding field dispersion curve;

define the mask as a pair of frequencies and a pair of slownesses;

for the first depth only, identify the mode of interest and defining the frequency range of the observed signals for that mode;

compute a slowness range as the estimated slowness+/−delta µs/ft, where the slowness is estimated from the formation properties at that depth; and for all depths after the first, take frequency range as the range associated with coherence values above a pre-defined threshold, and the slowness range as the estimated slowness+/−delta;

operate a neural net to generate one or more formation shear slowness values from either the flexural or Stoneley mode field dispersion curves; and process one or more resulting signals that are indicative of the one or more formation shear slowness values to image at least a portion of the subterranean formation.

5. A method of improving acoustic well logging to prospect for minerals in a subterranean formation intersected by a well, the method comprising, for each of a plurality of inversion depths of the well at which logging of data occurs or has occurred in generally anisotropic rock formations, carrying out the steps of:

obtaining, at at least one processing device, a plurality of acoustic log signals received at a plurality of acoustic well logging receivers of an acoustic logging tool in the well of the subterranean formation;

processing in the frequency domain, at the at least one processing device, the plurality of acoustic log signals representative of waveforms received at the plurality of acoustic well logging receivers to give rise to one or more flexural or Stoneley mode field dispersion curves by:

deriving a field dispersion curve by extracting dispersion information from the transformed acoustic log signals using one or more techniques in order to generate a field frequency semblance map containing a frequency semblance curve including the step of using a mask to isolate a region of the field frequency semblance map of interest in order to eliminate the risk of picking of coherence peaks derived from aliases or other unwanted modes in the field frequency semblance map;

selecting the position of the mask based on a preceding field dispersion curve;

defining the mask as a pair of frequencies and a pair of slownesses;

for the first depth only, identifying the mode of interest and defining the frequency range of the observed signals for that mode;

computing a slowness range as the estimated slowness+/−delta μs/ft, where the slowness is estimated from the formation properties at that depth; and for all depths after the first, taking frequency range as the range associated with coherence values above a pre-defined threshold, and the slowness range as the estimated slowness+/−delta;

operating, at the at least one processing device, a neural net to generate one or more formation shear slowness values from either the flexural or Stoneley mode field dispersion curves; and imaging, at the at least one processing device, at least a portion of the subterranean formation by processing one or more resulting signals that are indicative of the one or more formation shear slowness values.

6. The method of claim 5, wherein the one or more techniques are selected from the list including a weighted spectral semblance (WSS) method, Prony's method, Backward and Forward Extended Prony, Matrix Pencil, Maximum Entropy (ARMA), Predictive Array Processing, Maximum Likelihood, Non-Parametric, Homomorphic Processing, differential Phase Processing and Amplitude & Phase Estimation (APES) methods.

7. The method of claim 5, wherein obtaining, at the at least one processing device, the plurality of acoustic log signals received at the plurality of acoustic well logging receivers of the acoustic logging tool in the well of the subterranean formation comprises the steps of:

deploying the acoustic logging tool to a chosen depth along a borehole of the well in the subterranean formation;

causing withdrawal of the logging tool towards a surface location;

at each of a plurality of logging depths of the acoustic logging tool in the borehole, causing the logging tool to emit one or more acoustic energy waves, using one or more acoustic energy sources, such that the acoustic energy waves impinge on the formation;

causing the logging tool to detect one or more acoustic energy waves that have passed through the formation using one or more acoustic energy detectors that are spaced along the acoustic logging tool from the one or more acoustic energy sources, that are acoustically isolated from the one or more acoustic energy sources and that are activated by the detection of acoustic energy waves; and causing the logging tool to generate plural acoustic log signals that are characteristic of acoustic energy waves detected by the one or more acoustic energy detectors.

8. A method of improving acoustic well logging to prospect for minerals in a subterranean formation intersected by a well, the method comprising, for each of a plurality of inversion depths of the well at which logging of data occurs or has occurred in generally anisotropic rock formations, carrying out the steps of:

obtaining, at at least one processing device, a plurality of acoustic log signals received at a plurality of acoustic well logging receivers of an acoustic logging tool in the well of the subterranean formation;

processing in the frequency domain, at the at least one processing device, the plurality of acoustic log signals representative of waveforms received at the plurality of acoustic well logging receivers to give rise to one or more flexural or Stoneley mode field dispersion curves by:

deriving a field dispersion curve by extracting dispersion information from the transformed acoustic log signals using one or more techniques in order to generate a field frequency semblance map containing a frequency semblance curve; and applying a shape language model (SLM) algorithm during generation of the field frequency semblance map whereby to reduce or eliminate one or more artefacts selected from the list including noise in the field slowness-frequency semblance map values; ambiguity in aspects of the slowness values in the field slowness-frequency semblance map at low frequencies; the absence and/or distortion of an asymptote of the slowness-frequency semblance in the field slowness-frequency semblance map; and/or discontinuities in the field frequency semblance curve;

operating, at the at least one processing device, a neural net to generate one or more formation shear slowness values from either the flexural or Stoneley mode field dispersion curves; and imaging, at the at least one processing device, at least a portion of the subterranean formation by processing one or more resulting signals that are indicative of the one or more formation shear slowness values.

9. The method of claim 8, comprising the step of transforming one or more of the plurality of acoustic log signals to the frequency domain.

10. The method of claim 8, comprising the step of employing a curve fitting technique to find the one or more formation shear slowness values from the field dispersion curves.

11. The method of claim 8, wherein the waveforms received at one or more of the acoustic well logging receivers include energy representative of formation shear waves.

12. The method of claim 8, wherein the plurality of inversion depths of the well in respect of which the steps are carried out corresponds to a plurality of logging depths of the well at which logging of data occurs or has occurred in a one-to-one relationship.

13. The method of claim 8, wherein the plurality of inversion depths of the well in respect of which the steps are carried out corresponds to each Nth logging depth of the well at which logging of data occurs or has occurred, N being a real integer number that is greater than unity.

14. The method of claim 8, further comprising the steps of:

calculating in respect of each Nth logging depth of the well a slowness-time coherence (STC) value of shear slowness;

developing therefrom an STC shear slowness curve corresponding to the shear slowness values at the N respective logging depths;

developing from the measures of shear slowness of the formation at each Nth inversion depth an inversion shear slowness curve;

comparing the STC and inversion shear slowness curves at each Nth inversion depth and generating therefrom a correction curve;

interpolating the correction curve between the said inversion depths; and applying the correction to the STC curve calculated at every depth.

15. The method of claim 8, wherein the step of deriving the field dispersion curve from the transformed acoustic log signals includes the step of picking coherence peaks from the field slowness-frequency semblance map and generating therefrom a field dispersion curve.

16. The method of claim 15, the method further including the step of fitting a smooth curve joining plural apparent coherence peaks in a region of the field slowness-frequency semblance map and interpreting the field slowness-frequency semblance map such that picked peaks are constrained to be values lying on the smooth curve governed by the physics underlying the logging activity.

17. The method of claim 8, including the step of using a mask to isolate a region of the field frequency semblance map of interest in order to eliminate the risk of picking of coherence peaks derived from aliases or other unwanted modes in the field frequency semblance map.

18. The method of claim 8, wherein the one or more techniques are selected from the list including a weighted spectral semblance (WSS) method, Prony's method, Backward and Forward Extended Prony, Matrix Pencil, Maximum Entropy (ARMA), Predictive Array Processing, Maximum Likelihood, Non-Parametric, Homomorphic Processing, differential Phase Processing and Amplitude & Phase Estimation (APES) methods.

19. The method of claim 8, wherein obtaining, at the at least one processing device, the plurality of acoustic log signals received at the plurality of acoustic well logging receivers of the acoustic logging tool in the well of the subterranean formation comprises the steps of:
deploying the acoustic logging tool to a chosen depth along a borehole of the well in the subterranean formation;
causing withdrawal of the logging tool towards a surface location;
at each of a plurality of logging depths of the acoustic logging tool in the borehole, causing the logging tool to emit one or more acoustic energy waves, using one or more acoustic energy sources, such that the acoustic energy waves impinge on the formation;
causing the logging tool to detect one or more acoustic energy waves that have passed through the formation using one or more acoustic energy detectors that are spaced along the acoustic logging tool from the one or more acoustic energy sources, that are acoustically isolated from the one or more acoustic energy sources and that are activated by the detection of acoustic energy waves; and
causing the logging tool to generate plural acoustic log signals that are characteristic of acoustic energy waves detected by the one or more acoustic energy detectors.

20. The method of claim 19, wherein the acoustic log signals are generated as electrical or electronic signals.

21. The method of claim 20, the method including the step of processing the electrical or electronic signals using a processor forming part of the acoustic logging tool.

22. The method of claim 20, wherein the method includes the step of processing the electrical or electronic signals using a remote processor that is spaced from the acoustic logging tool.

23. The method of claim 21, comprising the step of causing the transmission of electrical or electronic signals from the acoustic logging tool to the remote processor.

24. The method of claim 19, wherein causing the acoustic logging tool to emit one or more acoustic energy waves includes operating one or more of a dipole or quadrupole acoustic energy source forming part of the acoustic logging tool.

25. The method of claim 8, wherein imaging, at the at least one processing device, at least the portion of the subterranean formation comprises the step of generating a log, plot, array or database of the one or more formation shear slowness values.

26. The method of claim 25, further including the steps of displaying, storing or transmitting the log, plot, array or database or generating one or more further signals derived therefrom.

27. The method of claim 26, comprising the step of processing the one or more further signals.

28. The method of claim 8, wherein obtaining, at the at least one processing device, the plurality of acoustic log signals received at the plurality of acoustic well logging receivers of the acoustic logging tool in the well of the subterranean formation comprises:
accessing, at a remote processor of the at least one processing device, the plurality of acoustic log signals stored in a memory of the logging tool; or
receiving, at a remote processor of the at least one processing device, communication of the plurality of acoustic log signals from the logging tool.

29. The method of claim 8, wherein the at least one processing device comprises a first processor of the logging tool and/or a second processor remote of the logging tool.

30. The method of claim 5, further comprising the steps of:
calculating in respect of each Nth logging depth of the well a slowness-time coherence (STC) value of shear slowness;
developing therefrom an STC shear slowness curve corresponding to the shear slowness values at the N respective logging depths;
developing from the measures of shear slowness of the formation at each Nth inversion depth an inversion shear slowness curve;
comparing the STC and inversion shear slowness curves at each Nth inversion depth and generating therefrom a correction curve;
interpolating the correction curve between the said inversion depths; and
applying the correction to the STC curve calculated at every depth.

* * * * *